(12) United States Patent
Uwai et al.

(10) Patent No.: US 6,420,501 B1
(45) Date of Patent: Jul. 16, 2002

(54) SUPPORTED METALLOCENE CATALYST, PROCESS FOR PREPARING THE SAME, AND PROCESS FOR PRODUCING OLEFIN POLYMERS

(75) Inventors: Toshihiro Uwai; Tsuyoshi Yahata, both of Ichihara; Jun Saito, Kimitsu, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/529,676

(22) PCT Filed: Oct. 20, 1998

(86) PCT No.: PCT/JP98/04739

§ 371 (c)(1),
(2), (4) Date: Apr. 18, 2000

(87) PCT Pub. No.: WO99/20661

PCT Pub. Date: Apr. 29, 1999

(30) Foreign Application Priority Data

Oct. 22, 1997 (JP) .............................................. 9-290032

(51) Int. Cl.[7] ................................................. C08F 4/64
(52) U.S. Cl. .................. 526/165; 526/129; 526/160; 526/153; 502/104; 502/120; 502/152; 502/158
(58) Field of Search .............................. 502/104, 120, 502/152, 158; 526/129, 160, 165, 153

(56) References Cited

U.S. PATENT DOCUMENTS 5,346,872 A  *  9/1994  Menon et al. .............. 502/116
5,795,838 A  *  8/1998  Tsutsui et al. .............. 502/103

FOREIGN PATENT DOCUMENTS

| JP | 5-155931 | 6/1993 |
| JP | 8-104691 | 4/1996 |
| JP | 8-157515 | 6/1996 |
| JP | 8-231621 | 9/1996 |
| JP | 8-511044 | 11/1996 |
| JP | 8-325327 | 12/1996 |
| WO | WO 94/28034 | * 12/1994 |

* cited by examiner

*Primary Examiner*—David W. Wu
*Assistant Examiner*—Caixia Lu
(74) *Attorney, Agent, or Firm*—McDermott, Will & Emery

(57) ABSTRACT

A supported metallocene catalyst comprising solid fine particles which comprise a reaction product of a metallocene compound and aluminoxane supported on the finely particulate inorganic support, said solid fine particles being produced by carrying out in order of the following steps:

(a) reacting a metallocene compound with an aluminoxane in an aromatic hydrocarbon solvent to form a reaction product, (b) contacting the reaction product with a finely particulate inorganic support at a temperature of 85 to 150° C. in the presence of any aromatic hydrocarbon solvent to form a solid product, and (c) washing the solid product with an aliphatic hydrocarbon solvent at a temperature of −50° C. to +30° C.

20 Claims, 8 Drawing Sheets

SUPPORTED METALLOCENE CATALYST, PROCESS FOR PREPARING THE SAME, AND PROCESS FOR PRODUCING OLEFIN POLYMERS

TECHNICAL FIELD

This invention relates to catalysts for olefin polymerization, and more particularly to supported metallocene catalysts wherein a reaction product of a metallocene compound and aluminoxane is supported on a fine particulate inorganic support, and processes for the production thereof. The invention also relates to processes for the production of olefin polymers by polymerizing olefin(s) in the presence of a catalyst system comprising the supported metallocene catalyst in combination with an organoaluminum compound.

BACKGROUND ART

Olefin polymers such as polypropylene and polyethylene have been extensively used in the field of various moldings such as films, fibers and injection-molded articles, because of their good mechanical properties, good chemical resistance and very useful balance with economy. As the catalyst for olefin polymerization for the manufacture of olefin polymers, the prior art has used a catalyst comprising an inorganic transition metal catalyst component such as titanium trichloride, titanium tetrachloride or the mixture thereof supported on a support such as magnesium chloride, in combination with an organoaluminum compound, what is called Ziegler-Natta catalyst system.

In recent years, metallocene catalyst systems comprising an organic complex of a transition metal, what is called a metallocene compound in combination with aluminoxane have been proposed as the catalysts for olefin polymerization, instead of prior Ziegler-Natta catalyst system. Olefin polymerization using these metallocene catalyst systems produces olefin polymers having narrow molecular weight distribution width (Mw/Mn), and also olefin copolymerization using them produces more homogeneous olefin copolymers wherein comonomers are copolymerized homogeneously, than those using prior Ziegler-Natta catalyst system.

These known metallocene catalyst systems include homogeneously mixed metallocene catalyst systems comprising a metallocene compound and aluminoxane and supported metallocene catalyst systems having a metallocene compound and/or aluminoxane supported on a finely particulate support.

Homogeneously mixed metallocene catalyst systems are applicable to a solution polymerization process, in view of industrial production of olefin polymers. When these catalyst systems are applied to a gas phase polymerization process and a slurry polymerization process generally employed in the Ziegler-Natta catalyst system, bulk density of the resulting olefin polymers is extremely low and the particle morphology is also poor. Further, the amount of aluminoxane used together with the metallocene compound in the homogeneous metallocene catalyst system is more than that of general organoaluminum compound used in prior Ziegler-Natta catalyst system, and also aluminoxane is more expensive than general organoaluminum compound. Therefore, there is a problem in the application of the homogeneously mixed metallocene catalyst system to industrial production of olefin polymers.

The supported metallocene catalyst systems have been proposed as the catalysts for olefin polymerization which can be employed in the gas phase and slurry polymerization processes. In these catalyst systems, the amount of aluminoxane used may be restricted, and bulk density and particle morphology of the resulting olefin polymer may be improved.

For instance, JPA 5-155931, JPA 8-104691, JPA 8-157515 and JPA 8-231621 disclose supported metallocene catalysts, preactivated supported metallocene catalysts, processes for the production thereof, and processes for the production of olefin polymers by polymerizing olefins using these catalysts. The working examples for preparing the supported metallocene catalyst described therein include (i) the example wherein silica and aluminoxane are contacted in toluene, and with or without washing with toluene, a toluene solution of the metallocene compound is added and contacted, and then the product is separated and washed with hexane to have aluminoxane and metallocene compound supported on silica, and (ii) the example wherein a mixed solution of aluminoxane and metallocene compound in toluene is added to a silica/toluene slurry, the product is separated by decantation and washed three times with hexane to have aluminoxane and metallocene compound supported on silica. In these examples, the temperature is controlled in each contact with silica, aluminoxane and metallocene compound by elevating or lowering it between 0° C. and 95° C. in multistage and finally lowering it to 60° C., and then a washing step with hexane is performed. Since there is no specific reference to the temperature in the washing step, it is presumed to be between 60° C. and ambient temperature.

WO 94/28034 (JPA 8-511044) discloses a supported metallocene catalyst which is prepared by contacting a metallocene compound represented by a specific chemical formula with aluminoxane in the presence of a solvent, contacting the resulting soluble reaction product with a porous support such as silica, removing the solvent and drying the supported catalyst; the supported metallocene catalyst which is preactivated by prepolymerizing the supported metallocene catalyst with one or more olefinic monomer(s); and a process for the preparation thereof as well as a process for the production of an isotactic polypropylene using this catalyst system. The process for the preparation of the supported metallocene catalyst comprises the step of contacting a reaction product of a soluble metallocene compound and aluminoxane with a porous support in a solvent, heating the supported product to about 70° C. under reduced pressure and evaporating the solvent until the product becomes a "mud" stage and all the solvent is removed, thereby preparing the supported metallocene catalyst, and the step of preactivating the supported metallocene catalyst by suspending again said catalyst in a hydrocarbon and prepolymerizing the catalyst with olefin(s).

The above-mentioned known art of the supported metallocene catalyst has accomplished some improvement in an olefin polymerization activity of the metallocene catalyst, reduction in the amount of aluminoxane used and improvement in bulk density and particle morphology of polyolefin obtained by using the metallocene catalyst.

On the other hand, there are many problems that reduction in stereoregularity of isotactic polypropylene should be controlled, that an olefin polymerization activity should be improved and that a process step for the preparation of the supported metallocene catalyst should be rationalized.

An object of the invention is to provide a supported metallocene catalyst for olefin polymerization having a high olefin polymerization activity.

Another object of the invention is to provide an improved process for the preparation of the supported metallocene catalyst.

Further object of the invention is to provide a process for the production of an olefin polymer using the supported metallocene catalyst.

In the present invention, polymerization of olefin(s) using the above supported metallocene catalyst can achieve the reduction in amount of aluminoxane used, control of the reduction in stereoregularity of the resulting olefin polymer and improvement in bulk density and particle morphology of the resulting olefin polymer.

SUMMARY OF THE INVENTION

The present inventors have made earnest studies in an effort to accomplish the above mentioned objects and, as a result, have found that a specific supported metallocene catalyst has dramatically improved olefin polymerization activity, the supported catalyst being prepared by reacting a metallocene compound with aluminoxane in an aromatic hydrocarbon solvent, supporting the reaction product on a fine particulate inorganic support at a relatively high temperature, and washing the resulting solid product with an aliphatic hydrocarbon at a relatively low temperature, thus leading to completion of the invention.

The present invention provides a supported metallocene catalyst for olefin polymerization comprising solid fine particles which comprise a reaction product of a metallocene compound and aluminoxane supported on the finely particulate inorganic support, said solid fine particles being produced by carrying out in order the following steps of:
 (a) reacting a metallocene compound with an aluminoxane in an aromatic hydrocarbon solvent to form a reaction product,
 (b) contacting the reaction product with a finely particulate inorganic support at a temperature of 85 to 150° C. in the presence of any aromatic hydrocarbon solvent to form a solid product having the reaction product supported on said inorganic support, and
 (c) washing the solid product with an aliphatic hydrocarbon solvent at a temperature of −50° C. to +30° C.; and also a process for the preparation of the supported metallocene catalyst.

The supported metallocene catalyst of the present invention includes that which is preactivated by further carrying out, subsequently to step (c), step (d) of prepolymerizing an olefin by introducing the olefin into a slurry of the solid fine particles dispersed in any aliphatic hydrocarbon solvent.

Another aspect of the present invention is a process for the production of an olefin polymer which comprises polymerizing olefin(s) in the presence of a catalyst system of the above-mentioned preactivated or non-preactivated supported metallocene catalyst in combination with an organoaluminum compound.

DETAILED DESCRIPTION OF THE INVENTION

Figure 1:
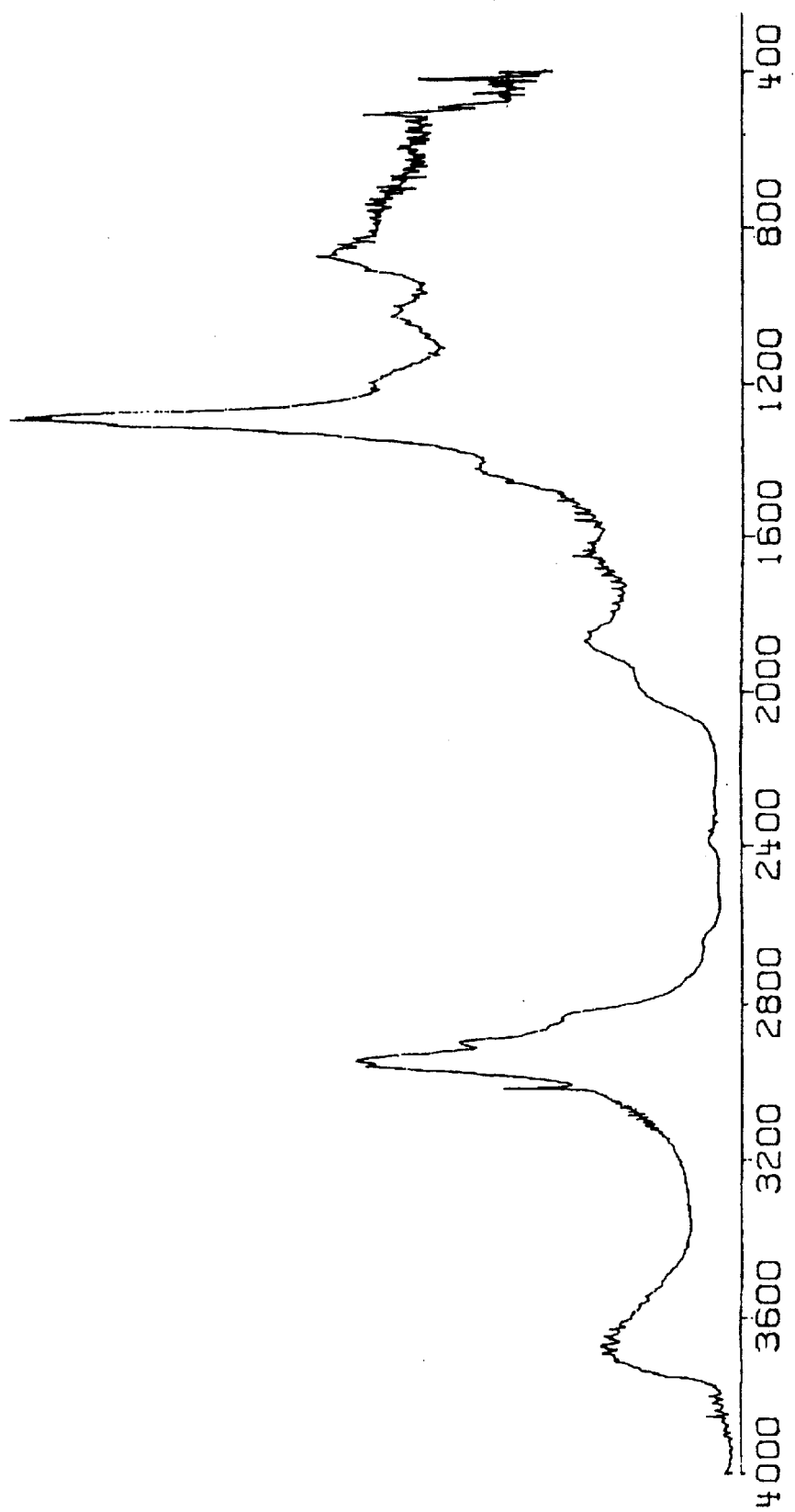
FIG. 1 is an infrared (IR) spectrum of the present supported metallocene catalyst which is prepared in Example 1.

The term "polymerization" as used herein refers to a homopolymerization of a specific monomer and a copolymerization of two or more monomers. Thus the term "olefin polymerization" refers to a homopolymerization of an olefin, a random and block copolymerization of two or more olefins. Further, the term "olefin polymer" refers to a homopolymer of an olefin, a random and block copolymer of two or more olefins.

The term "preactivation" refers to preliminary activation of the catalytic activity prior to use of the catalyst for the intended polymerization. The term "prepolymerization" refers to the polymerization which has been previously performed for preactivating the catalytic activity.

The above mentioned olefins include straight-chain monoolefins such as ethylene, propylene, 1-butene, 1-penetene, 1-hexene, 1-octene, 1-decene, 1-dodecene or the like; branched-chain monoolefins such as 3-methyl-1-butene, 4-methyl-1-pentene, 2-methyl-1-pentene or the like; cyclic olefins such as cyclopentene, cyclohexene, norbornene, 5-methyl-2-norbornene, 5-ethyl-2-norbornene, phenylnorbornene, indanyl norbornene or the like; linear polyenes such as 1,3-butadiene, isoprene, 1,4-hexadiene, 1,7-octadiene, 1,9-decadiene, 4-methyl-1,4-hexadiene, 5-methyl-1,4-hexadiene, 7-methyl-1,6-octadiene or the like; cyclic polyenes such as dicyclopentadiene, 5-methylene-2-norbornene, 5-ethylidene-2-norbornene or the like; styrenes such as styrene, vinylnaphthalene, a-methylstyrene or the like; derivatives such as 4-trimethylsiloxy-1,6-heptadiene, 5-(N,N-diisopropylamino)- 1-pentene or the like; and vinyl compounds such as vinylcyclohexane, vinyl chloride, methyl methacrylate, ethyl acrylate or the like.

The supported metallocene catalyst for olefin polymerization according to the present invention comprises solid fine particles which are produced by carrying out in order the following steps of:
 (a) reacting a metallocene compound with an aluminoxane in an aromatic hydrocarbon solvent to form a reaction product,
 (b) contacting the reaction product with a finely particulate inorganic support at a temperature of 85° C. to 150° C. in the presence of any aromatic hydrocarbon solvent to form a solid product having the reaction product supported on said inorganic support, and
 (c) washing the solid product with an aliphatic hydrocarbon solvent at a temperature of −50° C. to +30° C.

The supported metallocene catalyst comprising solid fine particles is preactivated by further carrying out, subsequently to step (c), step (d) of prepolymerizing an olefin by introducing the olefin into a slurry of the solid fine particles dispersed in any aliphatic hydrocarbon solvent.

The present invention is characterized by a combination of step (b) wherein the reaction product prepared in step (a) is contacted with the finely particulate inorganic support at relatively high temperatures within a specific temperature range, and step (c) wherein the solid product prepared in step (b) is washed with the aliphatic solvent at relatively low temperatures within a specific temperature range. This combination may provide an increase in the content of the metallocene compound and aluminoxane supported on the finely particulate inorganic support, and a remarkable improvement in the olefin polymerization activity (ZRp) per a transition metal atom supported on the supported metallocene catalyst and in To the olefin polymerization activity (Rp) per the supported metallocene catalyst.

The supported metallocene catalyst comprising solid fine particles contains 0.01–5% by weight, preferably 0.03–2% by weight of a transition metal derived from the metallocene compound and 0.1–50% by weight, preferably 1–40% by weight of aluminum derived from aluminoxane.

The content of the transition metal and the ratio of aluminum to the transition metal act on the polymerization activity of olefin(s). If the content of the transition metal is too little, no practical polymerization activity of olefin is obtained. If the content is too much, no polymerization activity according thereto is obtained.

The molar ratio of aluminum/transition metal is in the range of 1–1,000, preferably 5–700, and more preferably 10–500.

The supported metallocene catalyst comprising solid fine particles has a specific peak at 1426 cm$^{-1}$ in the infrared (IR) absorption spectrum determined by an infrared reflection method. This peak is a peak peculiar to the present supported metallocene catalyst. It is presumed that the presence of this peak and strength may act on the olefin polymerization activity.

The determination of the supported metallocene catalyst for the IR absorption spectrum by the infrared reflection method can be carried out using an infrared absorption apparatus with a resolution of 4 cm$^{-1}$ equipped with a diffuse reflection accessory as a heating cell (Nicolet® 60SXR, manufactured by Japan Optics Co., Ltd.) and filling a sample in a diffuse reflection accessory in a $N_2$ sealed glove box.

Representative IR absorption spectrum of the present supported metallocene catalyst is shown in FIG. 1.

Further, the supported metallocene catalyst comprising solid fine particles has at least 3 peaks in a pore distribution curve based on a nitrogen isothermal adsorption-desorption data measured by a nitrogen adsorption-desorption method, when compared with the finely particulate inorganic support used in its preparation. In the pore distribution curve, a peak showing the maximum pore diameter of the supported metallocene catalyst shifts from the pore diameter at a main peak of finely particulate inorganic support to the lower one. In the range of 50% or less of the maximum pore diameter, there are at least two peaks not appearing in the pore distribution curve of the finely particulate inorganic support. One of these peaks indicates a pore characterized by an ink bottle configuration. Further, the supported metallocene catalyst has a pore volume of 25–60%, preferably 30–50% based on the pore volume of the finely particulate inorganic support and also has a specific surface area of 85–98%, preferably 90–98% based on the specific surface area of the finely particulate inorganic support.

It is presumed that higher specific surface area and pore volume of the supported metallocene catalyst will improve the olefin polymerization activity.

The pore distribution and specific surface area of the supported metallocene catalyst and finely particulate inorganic support can be calculated from a nitrogen isothermal adsorption-desorption data measured by a continuous volume method using a high-purity nitrogen gas, with respect to a sample degassed in vacuum at 120° C. for 6 hrs, using an apparatus for measuring the pore volume by a nitrogen adsorption-desorption method (e.g., Omnisorp manufactured by COULTER Co., Ltd.).

Figure 2:
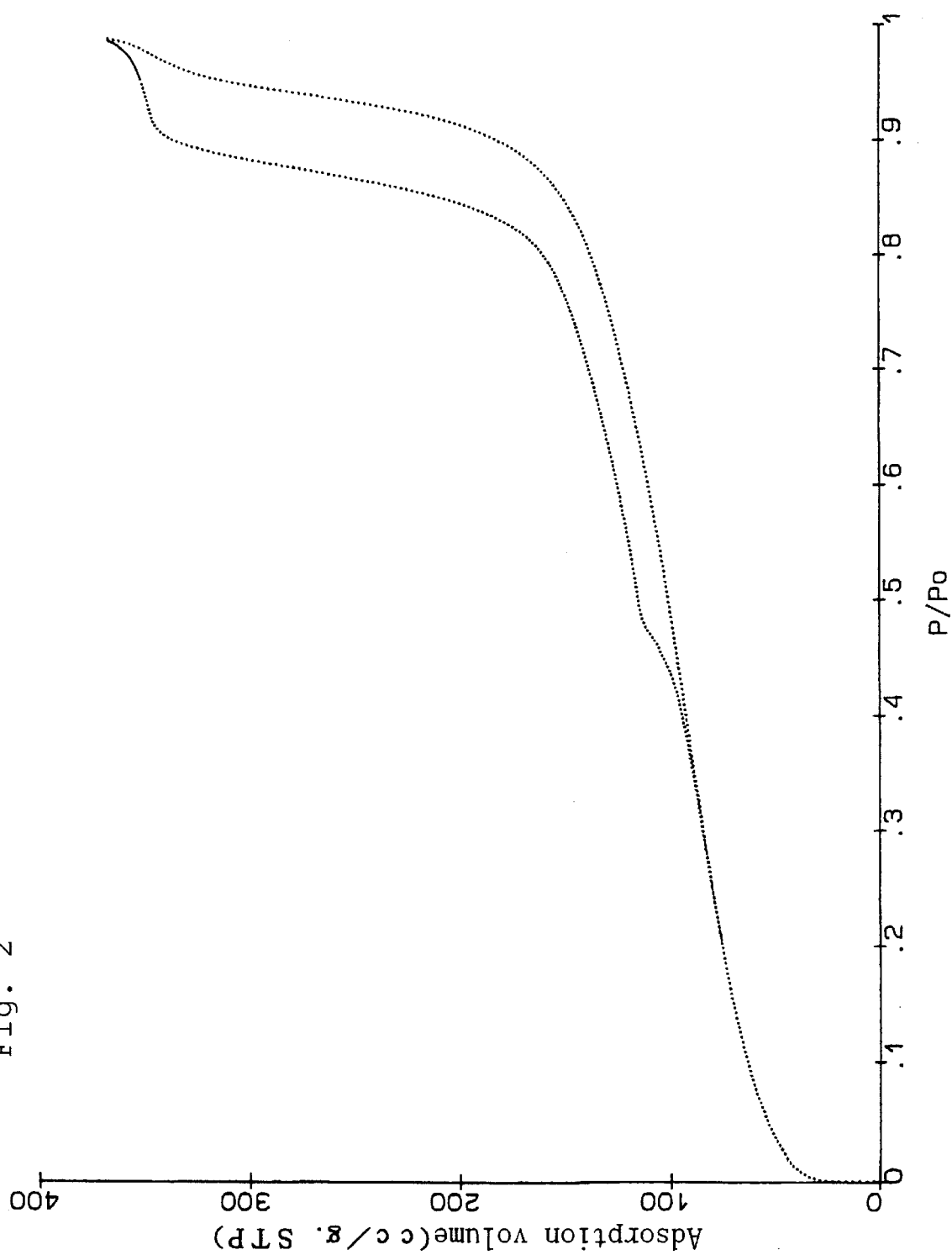
FIG. 2 is a nitrogen isothermal adsorption-desorption curve of the present supported metallocene catalyst which is prepared in Example 1.
Figure 3:
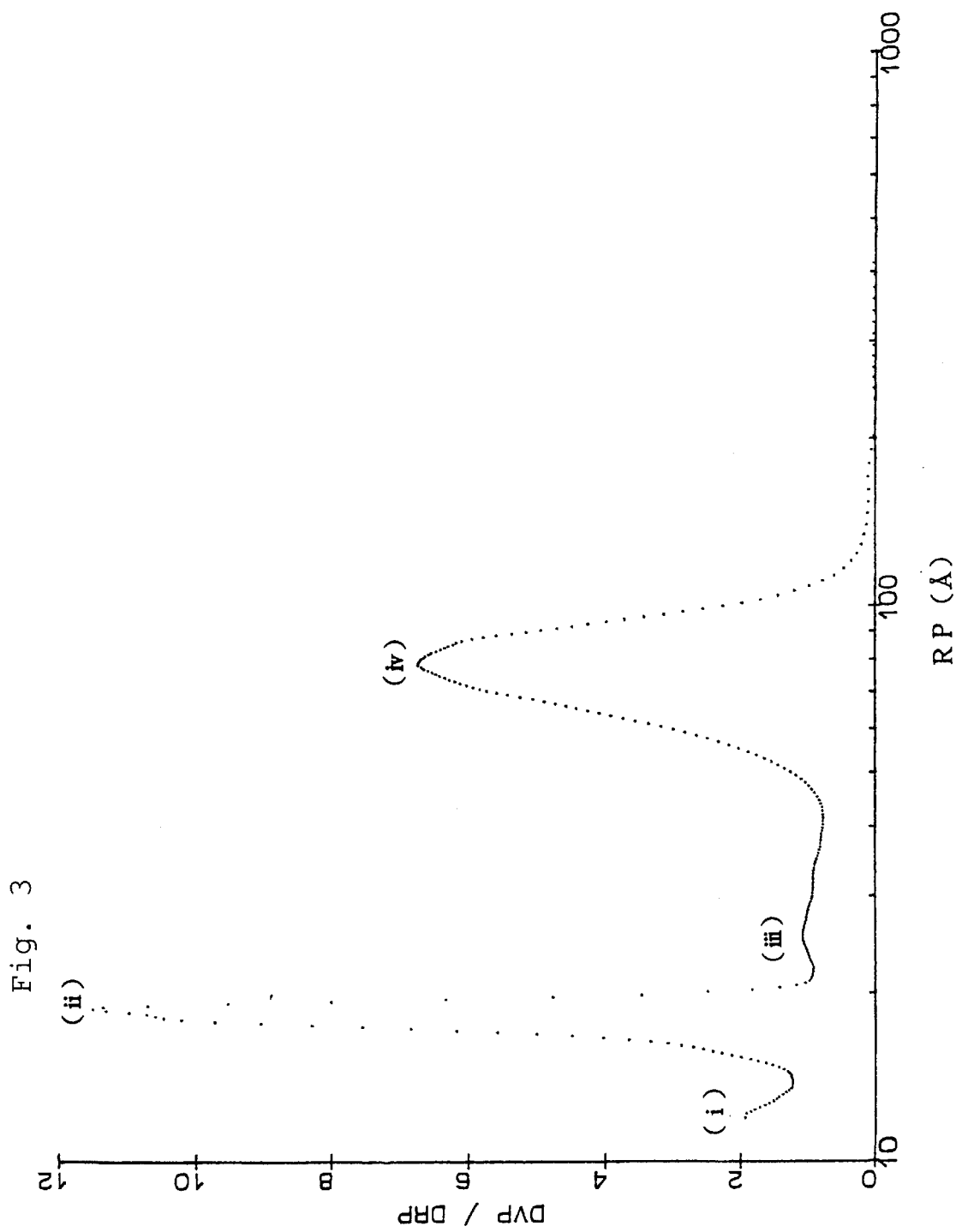
FIG. 3 is a pore distribution curve of the present supported metallocene catalyst prepared in Example 1.
Figure 6:
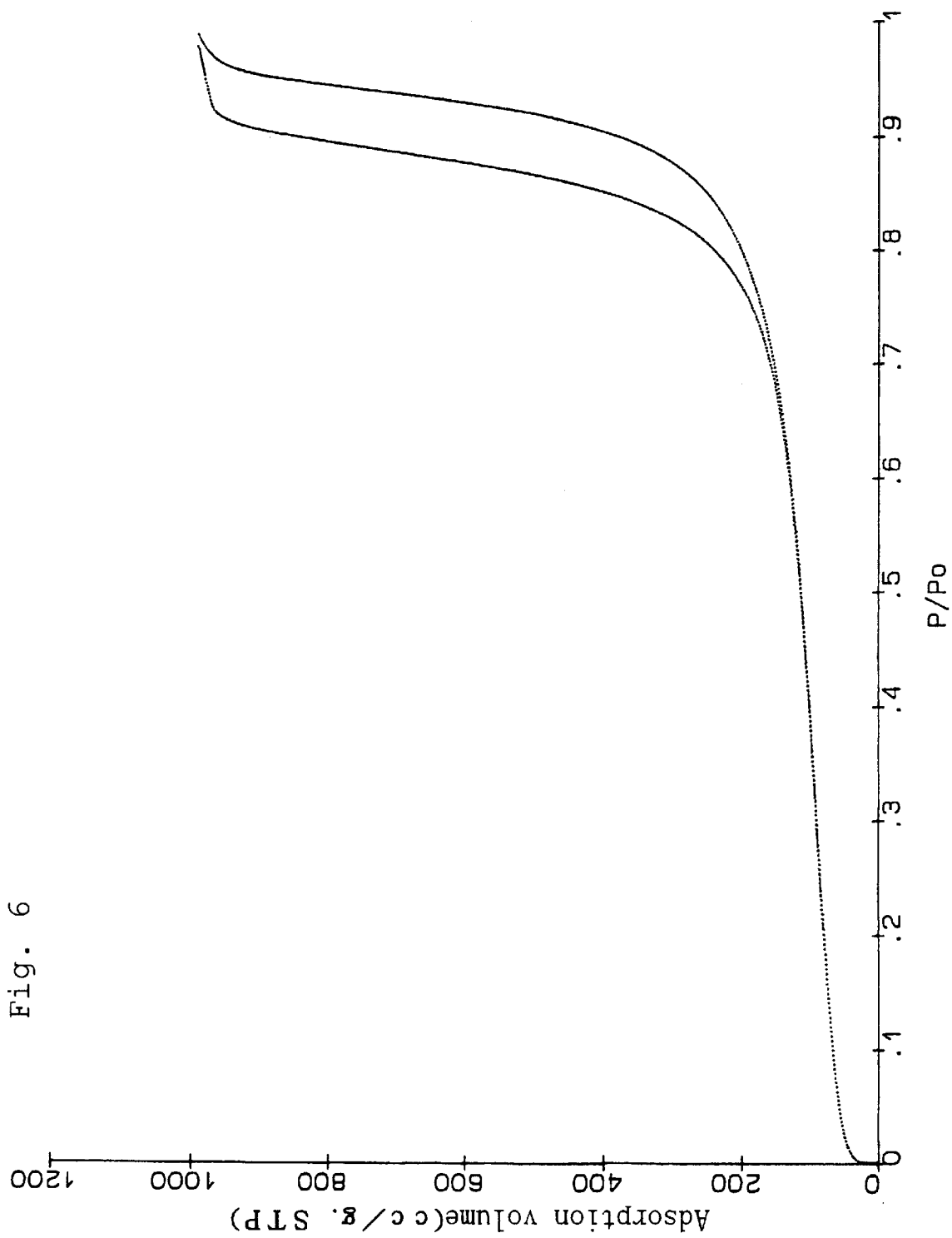
FIG. 6 is a nitrogen isothermal adsorption-desorption curve of the finely particulate inorganic support (silica) which is used in Examples and Comparative Examples.
Figure 7:
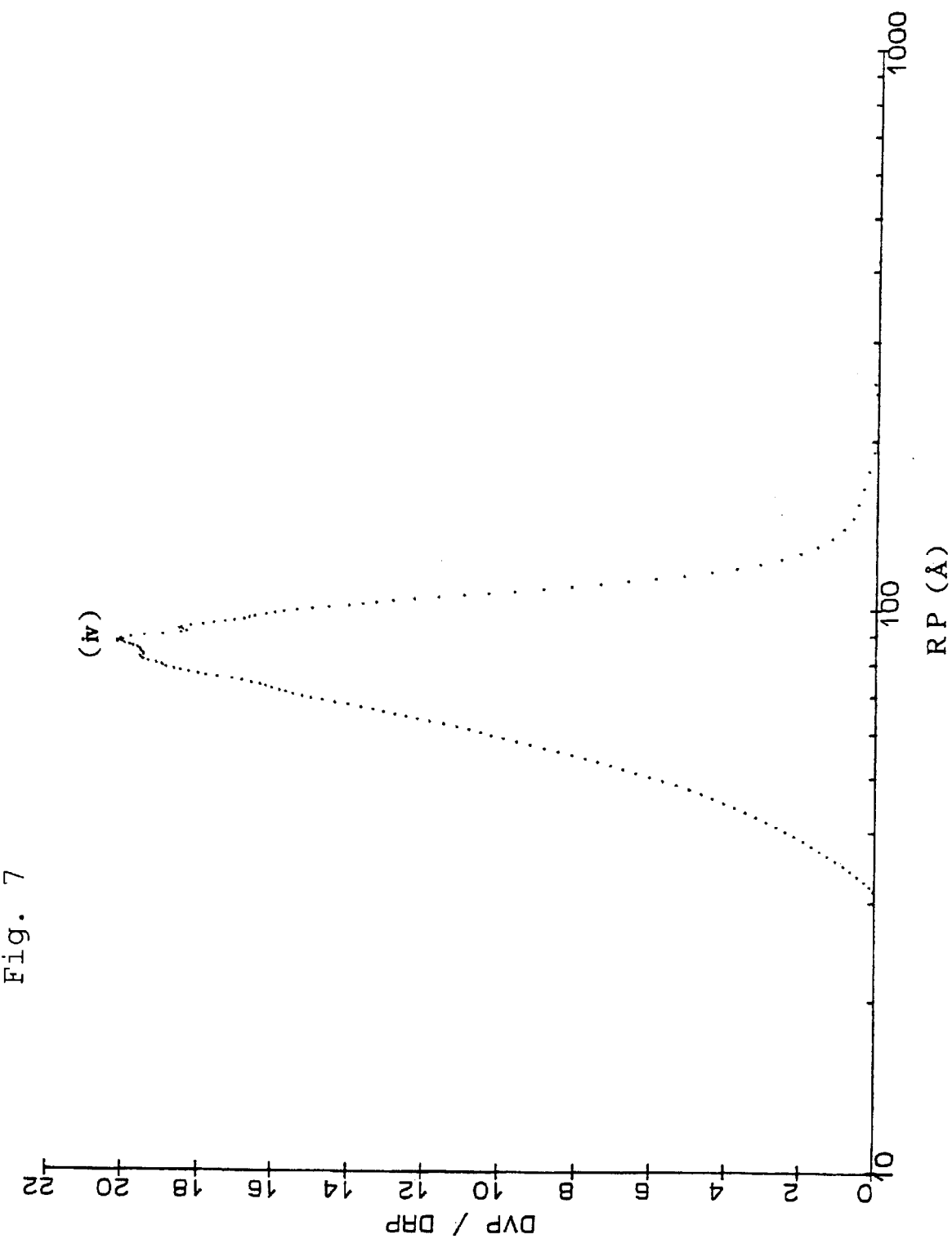
FIG. 7 is a pore distribution curve of the fine particulate inorganic support (silica) which is used in Examples and Comparative Examples.
Figure 8:
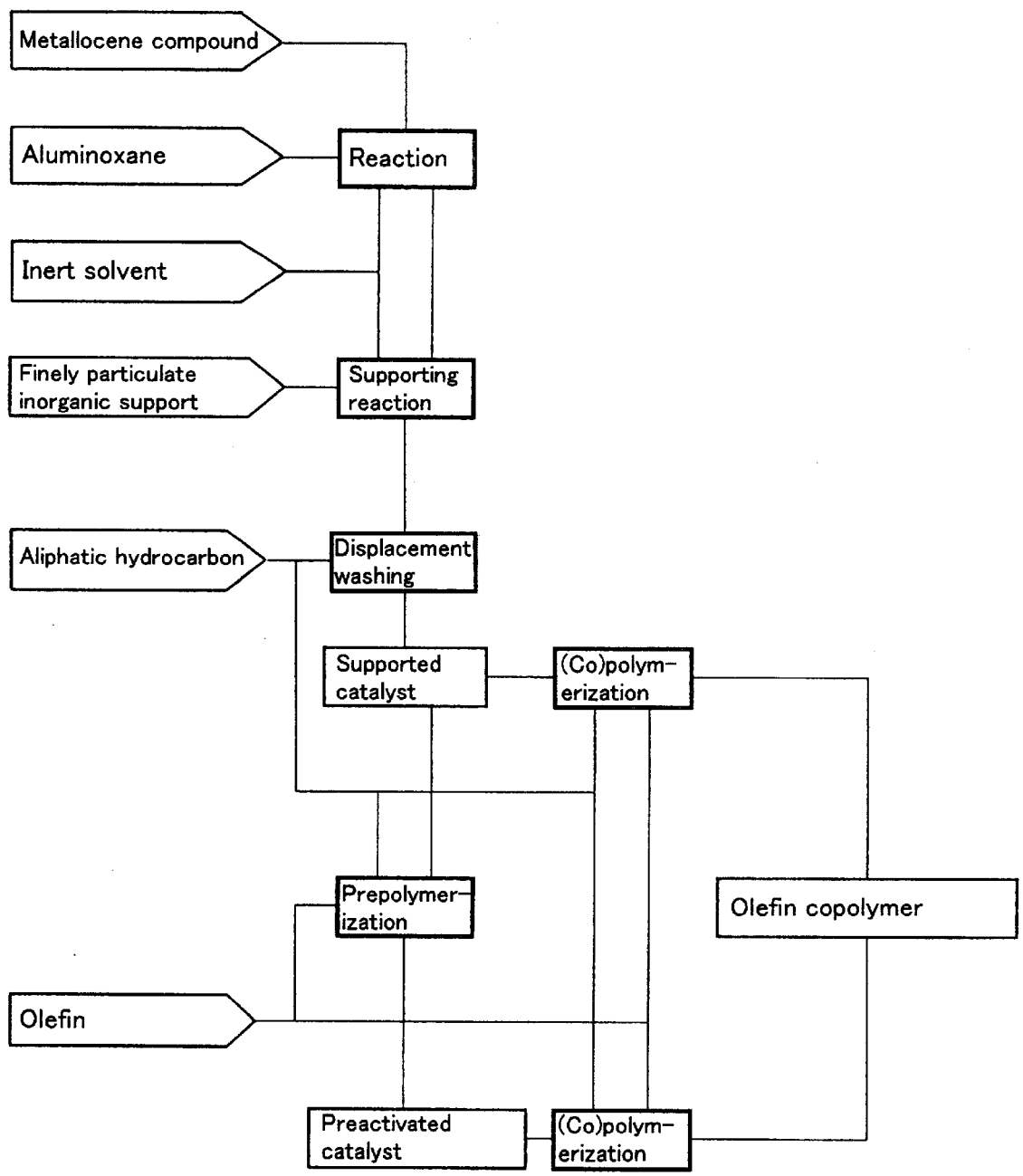
FIG. 8 is a flow sheet illustrating the present process for the preparation of the supported metallocene catalyst and olefin polymer.

Typical nitrogen isothermal adsorption-desorption curve and pore distribution curve of the present supported metallocene catalyst are shown in FIGS. 2 and 3, respectively, and the nitrogen isothermal adsorption-desorption curve and pore distribution curve of the finely particulate support used in the preparation thereof are shown in FIGS. 6 and 7, respectively.

On the supported metallocene catalyst preactivated by carrying out the above step (d), 0.01–100 kg, preferably 0.05–50 kg of prepolymerized olefin polymer per kg of the fine solid particles are coated and supported.

Olefins which are prepolymerized include straight-chain olefins of 2–20 carbons, e.g., ethylene, propylene, 1-butene, 1-pentene, 4-methyl-1-pentene, 2-methyl-1-pentene, 1-hexene, 1-octene, 1-decene, 1-dodecene or the like and the mixtue of the above two or more compounds. In particular, ethylene, propylene, 1-butene, or a mixture of olefins based on ethylene or propylene is preferable.

The prepolymerized olefin polymer has an intrinsic viscosity [η] in the range of preferably 0.1–10 dl/g, and more preferably 0.2–7 dl/g as determined in decalin at 135° C.

In the present invention, the metallocene compound is an organic complex of a transition metal represented by the following formula (1).

$$R_q MX_{(p-q)} \qquad 1)$$

In the formula, M represents a transition metal atom selected from Y, Sm, Zr, Ti, Hf, V, Nb, Ta and Cr, and is preferably Y, Sm, Zr, Ti or Hf, more preferably Zr, Ti or Hf.

p represents a coordination number of a transition metal atom M, and q is 1 or 2, preferably 2.

x independently represents a hydrogen atom, a halogen atom, a hydrocarbyl radical of 1–20 carbons, an oxygen-containing hydrocarbyl radical, a silicon-containing hydrocarbyl radical, a germanium-containing hydrocarbyl radical, a sulfur-containing hydrocarbyl radical, and a nitrogen-containing hydrocarbyl radical, and these radicals may be a divalent group attachable to R.

The hydrocarbyl radical of 1–20 carbons includes, e.g., an alkyl group of 1–20 carbons, an unsubstituted or substituted cycloalkyl group of 3–20 carbons, an alkenyl group of 2–20 carbons, an unsubstituted or substituted aryl lie group of 6–20 carbons, and an unsubstituted or substituted aryl alkyl group of 7–20 carbons. The oxygen-containing hydrocarbyl radical includes an alkoxy group of 1–20 carbons, an alkenyloxy group of 2–20 carbons, an unsubstituted or substituted aryloxy group of 6–20 carbons, an unsubstituted or substituted arylalkyloxy group of 7–20 carbons or the like.

The silicon-containing hydrocarbyl group includes, e.g., a silyl group having the above-mentioned hydrocarbyl radical such as a silylalkyl group. The germanium-containing hydrocarbyl radical includes a germyl group having the above-mentioned hydrocarbyl radical or the like. The sulfur-containing hydrocarbyl radical includes, e.g., a sulfonato group having the above-mentioned hydrocarbyl radical or the like. The nitrogen-containing hydrocarbyl radical includes, e.g., an amido group having the above-mentioned hydrocarbyl radical or the like.

The divalent group attachable to R includes, e.g., divalent groups such as alkylene, cycloalkylene, alkylidene, arylene, silylene, silalkylene, germylene, germylalkylene, amidoalkylene, amidosilylene or the like.

These groups may be further substituted with any of the above-mentioned substituents.

Preferable X is a halogen atom or an alkyl group of 1–20 carbons. More preferable is a chlorine atom or an alkyl group of 1–4 carbons.

R or R's represent π-electron conjugated ligand which coordinates to a transition metal atom M, for example, a ligand having a η-cyclopentadienyl structure, a η-benzene structure, a η-cycloheptatrienyl structure or a η-cyclooctatetraene structure, and preferable is a ligand having a η-cyclopentadienyl structure.

The ligand having a η-cyclopentadienyl structure includes, for example, a cyclopentadienyl group which is unsubstituted or substituted by the above-mentioned hydrocarbyl group or the like, an indenyl group, a hydrogenated indenyl group, a fluorenyl group or the like.

When q is 2, two ligands R's may be together linked through a divalent linkage group. The divalent linkage group includes divalent groups illustrated as X, preferably alkylene of 1–4 carbons, dialkylsilylene and dialkylgermylene.

The metallocene compounds of formula (1) wherein q is 1, i.e., those having one ligand R include, for example, (t-butylamide)(tetramethylcyclopentadienyl)-1,2-ethylenezirconium dimethyl, (t-butylamide)(tetramethyl-cyclopentadienyl)-1,2-ethylenetitanium dimethyl, (methylamide)(tetramethylcyclopentadienyl)-1,2-ethylenezirconium dibenzyl, (methylamide)(tetramethyl-cyclopentadienyl)-1,2-ethylenetitanium dimethyl, (ethylamide)(tetramethylcyclopentadienyl) methylenetitanium dimethyl, (t-butylamide)dibenzyl (tetramethyl-cyclopentadienyl)silylenezirconium dibenzyl, (benzylamide)-dimethyl(tetramethylcyclopentadienyl) silylenetitanium diphenyl, (phenylphosphide)dimethyl (tetramethyl-cyclopentadienyl)silylenezirconium dibenzyl or the like.

Illustrative examples of the metallocene compounds of formula (1) wherein q is 2, two ligands R's are not is linked each other and the transition metal M is zirconium are bis(cyclopentadienyl)zirconium dichloride, bis (cyclopentadienyl)zirconium dimethyl, bis (cyclopentadienyl)zirconium methylchloride, (cyclopentadienyl) (methylcyclopentadienyl)zirconium dichloride, (cyclopentadienyl)(methylcyclopentadienyl)-zirconium dimethyl, (cyclopentadienyl)(ethylcyclopentadienyl)zirconium dichloride, (cyclopentadienyl)-(ethylcyclopentadienyl)zirconium dimethyl, (cyclopentadienyl)(dimethylcyclopentadienyl)zirconium dichloride, (cyclopentadienyl)(dimethylcyclopentadienyl)-zirconium dimethyl, bis(methylcyclopentadienyl)zirconium dichloride, bis(methylcyclopentadienyl)zirconium dimethyl, bis(ethylcyclopentadienyl)zirconium dichloride, bis(ethylcyclopentadienyl)zirconium dimethyl, bis (propylcyclopentadienyl)zirconium dichloride, bis (propylcyclopentadienyl)zirconium dimethyl, bis (butylcyclopentadienyl)zirconium dichloride, bis (butylcyclopentadienyl)zirconium dimethyl, bis (dimethylcyclopentadienyl)zirconium dichloride, bis (dimethylcyclopentadienyl)zirconium dimethyl, bis (diethylcyclopentadienyl)zirconium dichloride, bis (diethylcyclopentadienyl)zirconium dimethyl, bis (methylethylcyclopentadienyl)zirconium dichloride, bis (methylethylcyclopentadienyl)zirconium dimethyl, bis (trimethylcyclopentadienyl)zirconium dichloride, bis (trimethylcyclopentadienyl)zirconium dimethyl, bis (triethylcyclopentadienyl)zirconium dichloride, bis (triethylcyclopentadienyl)zirconium dimethyl or the like. Further, they include the compounds wherein zirconium is replaced by yttrium, samarium, titanium, hafnium, vanadium, niobium, tantalum or chromium.

In the above-listed compounds, di-substitution forms on the cyclopentadienyl ring include 1,2- and 1,3-substitution forms, and tri-substitution forms include 1,2,3- and 1,2,4-substitution forms. The alkyl group such as propyl, butyl or the like includes its isomers such as n-, i-, sec-, tert- or the like.

Preferable metallocene compounds in the present invention are those of formula (1) wherein q is 2 and two ligands R's are linked each other through a divalent linking group, which are represented by the following formula (2).

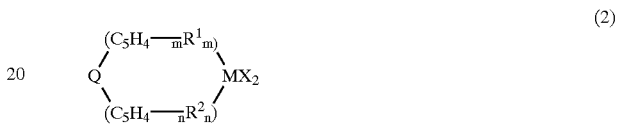

$$(2)$$

In the formula, M has the same meaning as mentioned above and is preferably Y, Sm, Zr, Ti or Hf, more preferably Ti, Zr or Hf.

X has the same meaning as mentioned above. More specifically, X include a hydrogen atom; a halogen atom such as fluorine, chlorine, bromine, iodine or the like; a hydrocarbyl radical of 1–20 carbons which include a linear alkyl group such as methyl, ethyl, propyl, i-propyl, butyl, i-butyl, tert-butyl, sec-butyl, pentyl, hexyl, heptyl, octyl, 2-ethylhexyl, nonyl, decyl, dodecyl, a cycloalkyl group of 3 to 20 carbons such as cyclopropyl, cyclopentyl, cyclohexyl, cycloheptyl and those substituted by said linear alkyl group, an aryl group of 6 to 20 carbons such as phenyl, naphthyl and those substituted by said alkyl group, and an aralkyl group of 7 to 20 carbons such as benzyl and those substituted by said alkyl group; an oxygen-containing hydrocarbyl radical wherein an oxygen atom is contained in said hydrocarbyl radical, such as alkoxy, alkoxyalkyl, aryloxy, aralkyloxy or the like; a silicon-containing hydrocarbyl radical wherein a silicon atom is contained in said hydrocarbyl radical, such as trialkylsilyl, triphenylsilyl, trialkylsilylalkyl or the like; a germanium-containing hydrocarbyl radical wherein a germanium atom is contained in said hydrocarbyl radical, such as trialkylgermyl, triphenylgermyl, trialkylgermylalkyl or the like; a sulfur-containing hydrocarbyl radical wherein a sulfur atom is contained in said hydrocarbyl radical, such as sulfonatoalkyl and sulfonatophenyl; a nitrogen-containing hydrocarbyl radical wherein a nitrogen atom is contained in said hydrocarbyl radical, such as alkylamido. Preferable is a halogen atom or an alkyl group of 1–20 carbons, and more preferable is a chlorine atom or an alkyl group of 1–4 carbons.

$(C_5H_{4-m}R^1_m)$ and $(C_5H_{4-n}R^2_n)$ each represent a substituted cyclopentadienyl group which is a preferred embodiment of R in formula (1), in which m and n are independently an integer of 1 to 4, each $R^1$ and each $R^2$ independently represent a hydrogen atom, a hydrocarbyl group of 1 to 20 carbons, an oxygen-containing hydrocarbyl radical, a silicon-containing hydrocarbyl radical, a germanium-containing hydrocarbyl radical, a sulfur-containing hydrocarbyl radical, a nitrogen-containing hydrocarbyl radical or a divalent hydrocarbyl radical wherein two of $R^1$'s and/or two of $R^2$'s can be joined together with two adjacent carbons on the cyclopentadienyl ring to form a saturated or unsaturated, monocyclic or polycyclic ring having 4 to 8 carbons within the ring, and the above-illustrated hydrocarbyl radicals or the like may be present on said mono- or poly-cyclic ring.

Preferable $R^1$ and $R^2$ are an alkyl group of 1–4 carbons, a phenyl group, a naphthyl group or the like, and a divalent group which can be joined with two adjacent carbons on the cyclopentadienyl ring to form an indenyl or fluorenyl group. On the indenyl or fluorenyl group, an alkyl group of 1–4 carbons, a phenyl group, a naphthyl group or the like may be present.

Q represents a divalent linking group capable of linking the substituted cyclopentadienyl group, which includes a divalent hydrocarbyl radical such as methylene, dimethylmethylene, dicloromethylene, ethylene, tetramethylethylene, unsubstituted or substituted cyclohexylene, and unsubstituted or substituted phenylene; a silylene group such as dimethylsilylene and dichlorosilylene; a divalent germanium-containing group (germylene) such as dimethylgermylene and dichlorogermylene; and a divalent stannum-containing group (stanylene) such as dimethylstariylene. Preferable is a divalent hydrocarbyl radical, a silylene group or a germylene group, and more preferable is dimethylsilylene or dimethylgermylene.

The metallocene compounds of formula (2) wherein two substituted cyclopentadienyl groups are linked include, for example, dimethylsilylene(3-t-butylcyclopentadienyl)-(fluorenyl)zirconium dichloride, dimethylgermylene(3-t-butylcyclopentadienyl)(fluorenyl)zirconium dichloride, dimethylsilylene(3-t-butylcyclopentadienyl)(fluorenyl)hafnium dichloride, ethylenebis(indenyl)zirconium dimethyl, ethylenebis(indenyl)zirconium dichloride, dimethylsilylenebis(indenyl)zirconium dimethyl, dimethylsilylenebis(indenyl)zirconium dichloride, dimethylgermylenebis(indenyl)zirconium dichloride, ethylenebis(tetrahydroindenyl)zirconium dimethyl, ethylenebis(tetrahydroindenyl)zirconium dichloride, dimethylsilylenebis(tetrahydroindenyl)zirconium dimethyl, dimethylsilylenebis(tetrahydroindenyl)zirconium dichloride, dimethylgermylenebis(tetrahydroindenyl) zirconium dichloride, dimethylsilylenebis(2-methyl-4,5,6,7-tetrahydroindenyl)-zirconium dichloride, dimethylsilylenebis(2-methyl-4,5,6,7-tetrahydroindenyl) zirconium dimethyl, ethylenebis(2-methyl-4,5,6,7-tetrahydroindenyl)hafnium dichloride, dimethylgermylenebis(2-methyl-4,5,6,7-tetrahydroindenyl)-zirconium dichloride, dimethylsilylene bis(2-methyl-4-phenylindenyl)zirconium dichloride, dimethylsilylenebis(2-methyl-4-phenylindenyl)zirconium dimethyl, dimethylsilylene-bis(2-methyl-4-phenylindenyl) hafnium dichloride, dimethylgermylenebis(2-methyl-4-phenylindenyl)zirconium dichloride, dimethylsilylenebis(2-methyl-4-naphthylindenyl)-zirconium dimethyl, dimethylsilylenebis(2-methyl-4-naphthylindenyl)hafnium dichloride, dimethylgermylenebis(2-methyl-4-naphthylindenyl)zirconium dichloride, dimethylsilylenebis(2-methyl-4,5-benzoindenyl)zirconium dichloride, dimethylsilylenebis(2-methyl-4,5-benzoindenyl)zirconium dimethyl, dimethylsilylenebis(2-methyl-4,5-benzoindenyl) hafnium dichloride, dimethylgermylenebis (2-methyl-4,5-benzoindenyl) zirconium dichloride, dimethylsilylenebis(2-ethyl-4-phenylindenyl)-zirconium dichloride, dimethylsilylenebis(2-ethyl-4-phenylindenyl)zirconium dimethyl, dimethylsilylenebis(2-ethyl-4-phenylindenyl) hafnium dichloride, dimethylgermylene-bis(2-ethyl-4-phenylindenyl)zirconium dichloride, dimethylsilylenebis(2-methyl-4,6-diisopropylindenyl)-zirconium dichloride, dimethylsilylenebis(2-methyl-4,6-diisopropylindenyl) zirconium dimethyl, dimethylsilylene-bis(2-methyl-4,6-diisopropylindenyl)hafnium dichloride, dimethylgermylenebis(2-methyl-4,6-diisopropylindenyl)-zirconium dichloride, dimethylsilylene(2,4-dimethylcyclopentadienyl)(3',5'-dimethylcyclopentadienyl)titanium dichloride, dimethylsilylene(2,4-dimethylcyclopentadienyl)-(3',5'-dimethylcyclopentadienyl)zirconium dichloride, dimethylsilylene(2,4-dimethylcyclopentadienyl)(3',5'-dimethylcyclopentadienyl)zirconium dimethyl, dimethylsilylene(2,4-dimethylcyclopentadienyl)(3',5'-dimethylcyclopentadienyl)hafnium dichloride, dimethylsilylene(2,4-dimethylcyclopentadienyl)(3',5'-dimethylcyclopentadienyl)hafnium dimethyl, dimethylgermylene(2,4-dimethylcyclopentadienyl)(3',5'-dimethylcyclopentadienyl)zirconium dichloride, dimethylsilylene(2,3,5-trimethylcyclopentadienyl)(2',4',5'-trimethylcyclopentadienyl)titanium dichloride, dimethylsilylene(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)zirconium dimethyl, dimethylsilylene(2,3,5-trimethylcyclopentadienyl)(2', 4',5'-trimethylcyclopentadienyl)hafnium dichloride, dimethylsilylene(2,3,5-trimethylcyclopentadienyl)(2',4'5'-trimethylcyclopentadienyl)hafnium dimethyl, dimethylgermylene(2,3,5-trimethylcyclopentadienyl)(2',4', 5'-trimethylcyclopentadienyl)zirconium dichloride or the like. Although the metallocene compounds are recited above with no distinction of their racemic and meso forms, both forms can be used.

Preferable metallocene compounds are chiral metallocene compounds of formula (2) wherein a substitution position of $R^1$ and $R^2$ on two cyclopentadienyl rings is arranged so as not to have jointly a symmetry plane containing M. In the polymerization of olefin(s) of 3 or more carbons, the use of the supported metallocene catalysts based on these metallocene compounds can produce high stereoregular olefin polymers.

More specifically, these compounds are other compounds than the meso compounds among the above-recited metallocene compounds, illustrative examples of which are dimethylsilylene(3-t-butylcyclopentadienyl)(fluorenyl)-zirconium dichloride, dimethylsilylene(3-t-butylcyclopentadienyl)(fluorenyl)hafnium dichloride, dimethylgermylene(3-t-butylcyclopentadienyl)(fluorenyl)-zirconium dichloride, rac-dimethylsilylenebis(2-methyl-4-phenylindenyl)zirconium dichloride, rac-dimethylsilylene-bis(2-methyl-4-phenylindenyl)hafnium dichloride, rac-dimethylgermylenebis(2-methyl-4-phenylindenyl) zirconium dichloride, rac-dimethylsilylenebis(2-methyl-4-naphthylindenyl)zirconium dichloride, rac-dimethylsilylene-bis(2-methyl-4-naphthylindenyl)hafnium dichloride, rac-dimethylgermylenebis(2-methyl-4-naphthylindenyl)zirconium dichloride, rac-dimethylsilylenebis(2-methyl-4,5-benzoindenyl)zirconium dichloride, rac-dimethylsilylene-bis(2-methyl-4,5-benzoindenyl)hafnium dichloride, rac-dimethylgermylenebis(2-methyl-4,5-benzoindenyl) zirconium dichloride, dimethylsilylene(2,4-dimethylcyclopentadienyl)-(3',5'-dimethylcyclopentadienyl)zirconium dichloride, dimethylsilylene(2,4-dimethylcyclopentadienyl)(3',5'-dimethylcyclopentadienyl)hafnium dichloride, dimethylgermylene(2,4-dimethylcyclopentadienyl)(3',5'-dimethylcyclopentadienyl)zirconium dichloride, dimethylsilylene(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)hafnium dichloride, dimethylgermylene(2,3,5-trimethylcyclopentadienyl)(2',4',5'-trimethylcyclopentadienyl)zirconium dichloride, and the compounds wherein zirconium of the above compounds is substituted by titanium or hafnium. These compounds may contain small quantity of the corresponding meso forms.

More preferable metallocene compounds are those of formula (2) wherein at least one of $R^1$ and $R^2$ substitutes a carbon adjacent to the carbon attached to Q on the cyclopentadienyl ring.

Illustrative examples of the above metallocene compounds are dimethylsilylene(2,3,5-trimethylcyclopentadienyl)(2',4',5'-trimethylcyclopentadienyl)titanium dichloride, dimethylsilylene(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)zirconium dimethyl, dimethylsilylene(2,3,5-trimethylcyclopentadienyl)-(2',4',5'-trimethylcyclopentadienyl)hafnium dichloride, dimethylsilylene(2,3,5-trimethylcyclopentadienyl)(2',4',5'-trimethylcyclopentadienyl)hafnium dimethyl, dimethylgermylene(2,3,5-trimethylcyclopentadienyl)(2',4',5'-trimethylcyclopentadienyl)zirconium dichloride or the like.

These compounds may contain small quantity of the corresponding meso forms.

Most preferable metallocene compounds are dimethylsilylene(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)hafnium dichloride, and dimethylgermylene(2,3,5-trimethylcyclopentadienyl)(2',4', 5'-trimethylcyclopentadienyl)zirconium dichloride. These compounds may contain small quantity of the corresponding meso forms.

In the present invention, aluminoxane is an organoaluminum compound represented by the following formula (3) or (4).

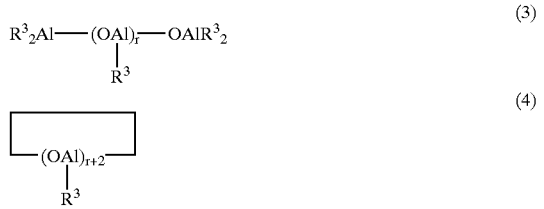

In the formulae, $R^3$ independently represents a hydrocarbyl radical of 1 to 6 carbons, preferably 1 to 4 carbons, e.g., an alkyl group such as methyl, ethyl, propyl, butyl, isobutyl, pentyl, hexyl, etc.; an alkenyl group such as allyl, 2-methylallyl, propenyl, isopropenyl, 2-methyl-1-propenyl, butenyl, etc.; a cycloalkyl group such as cyclopropyl, cyclobutyl, cyclopentyl, cyclohexyl, etc.; and an aryl group such as phenyl, etc.; more preferably an alkyl group; and most preferably methyl.

r is an integer of 4 to 30, preferably 6 to 30, and more preferably 8 to 30.

As aluminoxanes, commercially available products can be used. Further, aluminoxanes may be prepared under known various conditions, by the following illustrative methods:

i) A method of reacting a trialkyl aluminum, e.g., trimethyl aluminum, triisobutyl aluminum or the mixture thereof, directly with water in an organic solvent such as toluene, ether, etc.;

ii) A method of reacting a trialkyl aluminum, e.g., trimethyl aluminum, triisobutyl aluminum or the mixture thereof, with salts containing crystal water, e.g., copper sulfate hydrate and aluminum sulfate hydrate; and iii) A method of reacting water impregnated in silica gel or the like, with a trialkyl aluminum, e.g., trimethyl aluminum or triisobutyl aluminum, separately or simultaneously or successively.

Even if unreacted trialkyl aluminum remains in the aluminoxane prepared by these methods, there is no trouble especially.

In the present invention, the finely particulate inorganic supports are granular or spherical, fine particles of inorganic compounds or the mixtures thereof having a particle size of 5–300 μm, preferably 10–200 μm. These finely particulate inorganic supports are preferably porous, having a specific surface of 50–1,000 m²/g, preferably 100–700 m²/g and a pore volume of 0.3–2.5 cm³/g.

Preferred finely particulate inorganic supports are metal oxides, e.g., $SiO_2$, $Al_2O_3$, MgO, $TiO_2$, ZnO and the mixture thereof or the composite oxides thereof. The supports comprising $SiO_2$, $Al_2O_3$ and/or MgO as a main component are especially preferable. More specific inorganic compounds include $SiO_2$, $Al_2O_3$, MgO, $SiO_2$—$Al_2O_3$, $SiO_2$—MgO, $SiO_2$—$TiO_2$, $SiO_2$—$Al_2O_3$—MgO, etc. $SiO_2$ is especially preferable.

These finely particulate inorganic supports are used after fired usually at a temperature of 100–1,000° C., preferably 300–900° C., most preferably 400–900° C. The amount of water adsorbed on the surface of the fired finely particulate support is not more than 0.1% by weight, and preferably not more than 0.01% by weight. The content of hydroxyl group on the surface of the support is not less than 1.0% by weight, preferably 1.5–4.0% by weight, and more preferably 2.0–3.5% by weight.

These finely particulate inorganic supports may be subjected to a contact treatment with an organoaluminum compound and/or a halogen-containing silicone compound, prior to the use.

In the present invention, aromatic hydrocarbon solvents which are used in the reaction of the metallocene compound with aluminoxane in step (a) and in the contact of the reaction product with the finely particulate inorganic support in step (b) include, for example, benzene, toluene, xylene, cumene, etc. Preferably, toluene and the like used as a solvent for a commercially available aluminoxane solution are used as such or in combination with additional aromatic hydrocarbons such as toluene.

In place of the aromatic hydrocarbon solvents, the solvents inert to the metallocene compounds, aluminoxane and reaction products thereof can be used, for example, alicyclic hydrocarbons such as cyclopentane, methylcyclopentane, cyclohexane, cyclooctane or the like; halogenated aromatic and alicyclic hydrocarbons wherein said aromatic and alicyclic hydrocarbons are substituted by halogen(s), and their mixed solvents; mixed solvents of the above hydrocarbons with the aromatic hydrocarbons; and ethers such as ethyl ether, tetrahydrofuran or the like.

The aliphatic hydrocarbon solvents used in the washing in step (c) and in the prepolymerization of olefin in step (d) include, for example, butane, tetramethylbutane, pentane, ethylpentane, trimethylpentane, hexane, methylhexane, ethylhexane, dimethylhexane, heptane, methylheptane, octane, nonane, decane, hexadecane, octadecane and their mixed solvents. Preferable are n-pentane, n-hexane, n-heptane and their mixed solvents.

The reaction of the metallocene compound with aluminoxane in step (a) is carried out by stirring and holding 10–1,000 mols, preferably 20–500 mols (in terms of an aluminum atom) of aluminoxane per mol of the metallocene compound (1 mol of a transition metal atom) in an aromatic hydrocarbon under the temperature condition of −50° C. to +100° C., preferably 0° C. to +50° C., more preferably +20° C. to +30° C., for 1 minute to 10 hrs, preferably 3 minute to 5 hrs, by which a reaction product of the metallocene compound and aluminoxane is prepared.

The use of aromatic hydrocarbon solvents as a reaction solvent is preferable in proceeding the reaction homogeneously and efficiently. There is no particular restriction on the amount of aromatic hydrocarbon solvents used, but usually about 10–10,000 liters, preferably about 10–1,000 liters are used per mol of the metallocene compound.

In the subsequent step (b), the reaction product is contacted with a finely particulate inorganic support at a temperature of 85–150° C., preferably 90–130° C., most preferably 95–120° C., for 5 minutes to 100 hrs, preferably 10 minutes to 50 hrs, in the presence of the aromatic hydrocarbon solvent used as a reaction solvent in step (a), thereby producing a solid product wherein the reaction product is supported on the finely particulate inorganic support. In this contact reaction, additional aromatic hydrocarbon solvent may be added as the need arises.

A ratio of the reaction product to the finely particulate inorganic support is 1–1,000 kg, preferably 5–500 kg of the finely particulate inorganic support per mol of the transition metal atom in the reaction solution prepared in step (a). The amount of aromatic hydrocarbon solvent used is 10–10,000 liters, preferably 10–1,000 liters per mol of the transition metal atom in the reaction solution prepared in step (a).

The temperature conditions for contacting the reaction product with the finely particulate inorganic support are important factors. The contact within the above temperature range can achieve high olefin polymerization activity of the resultant supported metallocene catalyst, and high bulk density and good particle morphology of the olefin polymer produced using the supported metallocene catalyst.

In the subsequent step (c), the solid product prepared in step (b) is washed with an aliphatic hydrocarbon solvent at a temperature of −50 to +30° C., preferably −30 to +10° C., more preferably −20 to 0° C., to prepare the supported metallocene catalyst for olefin polymerization comprising the solid particles having the reaction product supported on the finely particulate inorganic support.

The methods which can be employed as the step (c) include, for example, a method wherein after completion of step (b), an aromatic hydrocarbon solvent is separated from a slurry of a reaction solution containing the solid product by filtration, centrifugal separation, decantation, etc. and the resultant solid product is washed with an aliphatic hydrocarbon solvent; and a method wherein after completion of step (b), an aliphatic hydrocarbon solvent is added without separating an aromatic hydrocarbon solvent from a slurry of a reaction solution containing the solid product, a mixed solvent of the aromatic hydrocarbon and the aliphatic hydrocarbon is separated, and the resultant solid product is washed with an aliphatic hydrocarbon. In particular, the latter method provides a large improvement in the olefin polymerization activity, and is therefore preferable.

The washing of the solid product is repeated using 1–500 liters, preferably 10–100 liters of the aliphatic hydrocarbon solvent per kg of the finely particulate inorganic support per washing, until no metallocene compound is dissolved out in the aliphatic hydrocarbon after washing. Washing at least two times, usually not less than four times is sufficient, but not limited thereto.

In step (c), the temperature conditions for washing are important factors like those for contacting the reaction product with the finely particulate inorganic support. Washing within the above temperature range can achieve high olefin polymerization activity of the resultant supported metallocene catalyst, and high bulk density and good particle morphology of the olefin polymer produced using the supported metallocene catalyst.

In the present invention, the supported metallocene catalysts comprising solid fine particles prepared in step (c) can be used as such or in combination with the organoaluminum compounds as mentioned later, for the polymerization of olefins carried out by a gas phase polymerization process or a bulk polymerization process.

When the polymerization of olefin is carried out by a slurry polymerization process using a solvent, and in the preferred embodiments of a gas phase polymerization process and a bulk polymerization process, the supported metallocene catalyst, of which the olefin polymerization activity has been preactivated, is used in combination with an organoaluminum compound.

The supported metallocene catalyst can be preactivated by carrying out, subsequently to step (c), further step (d) of prepolymerizing the supported catalyst by introducing an olefin into a slurry of solid fine particles dispersed in an aliphatic hydrocarbon solvent.

As the slurry of solid fine particles dispersed in an aliphatic hydrocarbon solvent, the solid fine particles prepared in the washing at the final stage of step (c) may be used as such without separation from the aliphatic hydrocarbon solvent, or the solid fine particles may be separated from the aliphatic hydrocarbon solvent and redispersed in the same solvent for the use.

An olefin can be prepolymerized in liquid phase using the olefin itself to be polymerized as a solvent or in gas phase without any solvent, and preferably in the presence of an aliphatic hydrocarbon so as to control the polymerization of a small quantity of olefin and to proceed a homogeneous reaction.

The prepolymerization of olefin in the aliphatic hydrocarbon is performed by introducing 0.01–1,000 kg, preferably 0.1–500 kg of an olefin into a slurry comprising 0.005–5 m$^3$, preferably 0.01–1 m$^3$ of an aliphatic hydrocarbon solvent per kg of the solid fine particles and polymerizing the olefin at a temperature of −50 to +100° C., preferably 0 to +50° C., for one minute to 50 hrs, preferably 3 minutes to 20 hrs.

In the prepolymerization of olefin, there is no need to newly add a cocatalyst, a typical example of which is an organoaluminum compound such as trialkylaluminum and aluminoxane, since a reaction product of the metallocene compound and aluminoxane has been supported on the solid fine particles. The cocatalyst may be added if desired. The amount of the cocatalyst added is preferably within the range of not more than 1,000 mols, preferably not more than 500 mols (in terms of an aluminum atom) in the sum total with aluminum derived from aluminoxane, per mol of a transition metal atom in the solid fine particles.

Further, the prepolymerization of olefin may be carried out in the presence of hydrogen to control the molecular weight of the resulting olefin prepolymer, thus controlling the intrinsic viscosity [η] in the above-mentioned range as determined in decalin at 135° C.

The preactivated, supported metallocene catalysts as prepared above are used in the polymerization of olefin(s), in combination with the organoaluminum compound, in the slurry state after completion of the prepolymerization of olefin or in the resuspended state in an aliphatic hydrocarbon after completion of the prepolymerization of olefin and washing with the aliphatic hydrocarbon, or in the dry state by separation of the aliphatic hydrocarbon.

The processes for producing the olefin polymers according to the present invention are characterized by polymerizing olefin(s) in the presence of a catalyst system comprising the non-preactivated or preactivated supported metallocene catalyst in combination with the organoaluminum compound.

The organoaluminum compound constituting the catalyst system for olefin polymerization is represented by the following formula.

In the formula, $R^4$ and $R^5$ are each independently a hydrocarbyl radical such as an alkyl group of 1–10 carbons, a cycloalkyl group, an aryl group or the like, a phenyl group which may have substituent(s) such as an alkoxy group, a fluorine atom, methyl, trifluorophenyl or the like, X is a halogen atom, and s and t are any integer satisfying $0 < s+t \leq 3$.

The organoaluminum compounds represented by the above formula include, e.g., a trialkylaluminum such as trimethylaluminum, triethylaluminum, tri-isopropylaluminum, tri-isobutylaluminum, tri-n-butylaluminum, tri-n-hexylaluminum, tri-n-octylaluminum or the like; a dialkylaluminum hydride such as dimethylaluminum hydride, diethylaluminum hydride, diisopropylaluminum hydride, diisobutylaluminum hydride or the like; a dialkylaluminum halide such as dimethylaluminum chloride, dimethylaluminum bromide, diethylaluminum chloride, diisopropylaluminum chloride or the like; an alkylaluminum sesquihalide such as methylaluminum sesquichloride, ethylaluminum sesquichloride, ethylaluminum sesquibromide, isopropylaluminum sesquichloride or the like; and the mixtures of these two or more compounds. Preferable organoaluminum compound are a trialkylaluminum such as triethylaluminum, tri-isobutylaluminum, tri-n-butylaluminum, tri-n-hexylaluminum, tri-n-octylaluminum or the like, and a dialkylaluminum hydride such as diisobutylaluminum hydride or the like. In particular, triethylaluminum and tri-isobutylaluminum can achieve a more improved olefin polymerization activity of the supported metallocene catalyst and a remarkable effect of providing the resulting polymer with higher molecular weight.

The amount of the organoaluminum compound used ranges from 1 to 5,000 mols, preferably 5 to 3,000 mols and most preferably 10 to 1,000 mols (in terms of an Al atom in the organoaluminum compound) per mol of the transition metal atom in the catalyst system.

The amount of the catalyst system used is from $1 \times 10^{-10}$ to $1 \times 10^{-3}$ mol, preferably $1 \times 10^{-9}$ to $1 \times 10^{-4}$ mol in terms of the transition metal atom in the catalyst system, per liter of a polymerization volume. The amount of the catalyst system used in the above range can keep the efficient and controlled reaction rate of a polymerization of olefins.

The term "polymerization volume" as used herein means a volume of a liquid phase section within a polymerization reactor in case of a liquid phase polymerization, and a volume of a gas phase section within a polymerization reactor in case of a gas phase polymerization.

As a process for the polymerization of olefin, known olefin polymerization processes can be employed. They include, for example, a slurry polymerization process wherein an olefin is polymerized in an inert solvent including an aliphatic hydrocarbon such as butane, pentane, hexane, heptane, isooctane or the like, an alicyclic hydrocarbon such as cyclopentane, cyclohexane, methylcyclohexane or the like, an aromatic hydrocarbon such as toluene, xylene, ethylbenzene or the like, and gasoline fraction, hydrogenated diesel oil and the like; a bulk polymerization process wherein an olefin itself is used as a solvent; a gas phase polymerization process wherein an olefin is polymerized in gas phase; and a combination of these two or more polymerization processes.

The polymerization conditions employed in the above-mentioned processes are usually the same as in the polymerization of olefins using known Ziegler-Natta catalyst system. For example, the polymerization is performed at a polymerization temperature of −50 to +150° C., preferably −10 to +100° C., for about 1 minute to 20 hrs, by feeding olefin(s) so as to maintain the polymerization pressure in the range of atmospheric pressure to 7 MPa, preferably 0.2 to 5 MPa, in the presence of hydrogen as a molecular weight modifier.

After the polymerization of olefin is completed, known after-treatments such as deactivation of catalyst, removal of catalyst residues and drying are carried out, if necessary, to produce the aimed olefin polymers.

The resultant final olefin polymers may be incorporated, if necessary, with various additives such as antioxidants, ultraviolet absorbing agents, antistatic agents, nucleating agents, lubricants, flame retardants, antiblocking agents, colorants, inorganic or organic fillers, and further, various synthetic resins. The olefin polymers are usually melt-kneaded and cut into granulates or pellets which are served for the manufacture of various moldings.

EXAMPLE

The invention is further illustrated by the following Examples and Comparative Examples.

(A) Preparation of Supported Metallocene Catalyst

Example 1

Preactivated Supported Metallocene Catalyst (Ex-1)

(a) A 4-dm³ glass reaction vessel equipped with a stirrer and purged with nitrogen was charged with 1.37 liter (4.11 mol in terms of Al atom) of a toluene solution of methylaluminoxane (concentration: 3 mol/L, trade name: PMAO manufactured by Tosoh Akzo K.K.), and 16.6 mmol of a mixture of chiral dimethylsilylene(2,3,5-trimethylcyclopentadienyl)-(2',4',5'-trimethylcyclopentadienyl)zirconium dichloride and its meso form, dimethylsilylene(2,3,5-trimethylcyclopentadienyl)(2',3',5'-trimethylcyclopentadienyl) zirconium dichloride (1 mol % of meso content) as a metallocene compound, and the mixture was reacted at 25° C. for 5 minutes while stirring to obtain a reaction product.

(b) To the reaction vessel were added 100 g of silica having an average particle size of 51 μm (SYLOPOL® 948, manufactured by Grace Davison) which had been fired at 750° C. under reduced pressure for 8 hrs, and the temperature of the vessel was elevated to 100° C. Then, the reaction product obtained above and the silica were contacted while stirring for 1 hour to give a solid product.

(c) After the reaction vessel was cooled to −10° C., 2 liters of n-hexane were added and the mixture was stirred for 5 minutes. The stirrer was stopped and the solvent was separated by decantation. Subsequently, 2 liters of n-hexane were added to the vessel, while keeping the temperature of the vessel at −10° C. The mixture was stirred and washed for 5 minutes, the stirrer was stopped, and the washing solvent was separated by decantation. This washing operation was repeated four times to obtain to solid fine particles. Additional 2 liters of n-hexane were charged in the vessel and the solid fine particles were dispersed to form a slurry.

A part of the resulting solid particle/n-hexane slurry was taken, and the solvent was separated from the slurry, which was then dried under reduced pressure to give the solid fine particles. Analysis of the resultant fine particles showed that they contained 0.61% by weight of Zr and 18.2% by weight of Al and also that they had a specific peak at 1426 cm$^{-1}$ in the IR spectrum, from which they were confirmed to be the supported metallocene catalyst having a reaction product of the metallocene compound and methylaluminoxane supported on silica.

The IR spectrum of the resulting supported metallocene catalyst is shown in FIG. 1.

The resultant supported metallocene catalyst comprised of solid fine particles having a particle size of 350 μm or more. No agglomerate was observed.

(d) A 4-dm$^3$ stainless reaction vessel equipped with a stirrer and purged with nitrogen was charged with 2 liters of n-hexane. The solid fine particle/n-hexane slurry as prepared above was transferred to the vessel kept at 0° C. While keeping the vessel at 0° C. with stirring, propylene gas was fed for 90 minutes at a rate of 0.15 mol/min to carry out the prepolymerization. The resulting propylene homopolymer was supported on the solid fine particles. During this prepolymerization, unreacted propylene gas was discharged out of the vessel. After the prepolymerization time passed, the supply of propylene gas was stopped. While elevating the temperature of the vessel to 25° C., a gas phase in the reaction vessel was purged with nitrogen.

After the solvent was separated from the reaction mixture by decantation, 2 liters of n-hexane were added, the preactivated supported metallocene catalyst was stirred and washed for 5 minutes, and the washing solvent was separated by decantation. This washing operation was repeated four times. Additional 2 liters of n-hexane were added to the vessel and the resulting preactivated supported metallocene catalyst (Ex-1) was dispersed in n-hexane to form a slurry.

A part of the resulting preactivated supported metallocene catalyst/n-hexane slurry was taken, and the solvent was separated from the slurry, which was then dried under reduced pressure to give a preactivated catalyst. Analysis of the resultant preactivated catalyst showed that 0.7 g of polypropylene per 1 g of the solid fine particles was supported.

Example 2

Preactivated Supported Metallocene Catalyst (Ex-2)

n-Hexane slurry containing the supported metallocene catalyst preactivated with an ethylene homopolymer was prepared by treatment under the same conditions as in Example 1, except that the prepolymerization was performed by feeding ethylene to the reactor at a rate of 0.07 mol/min, in place of propylene in Example 1(d), in the presence of a solid fine particle/n-hexane slurry prepared under the same conditions as in Example 1(a)–(c).

The subsequent separation of the solvent from the slurry by filtration and drying at 30° C. under reduced pressure gave a solid, preactivated supported metallocene catalyst (Ex-2).

Analysis of the preactivated supported metallocene catalyst (Ex-2) showed that 0.8 g of polyethylene per 1 g of the solid fine particles was supported.

Example 3

Supported Metallocene Catalyst (Ex-3)

A slurry of solid fine particles dispersed in isopentane was prepared by treatment under the same conditions as in Example 1, except that the temperature upon contacting a reaction product of the metallocene compound and aluminoxane with silica in Example 1(b) was changed to 115° C., that washing of the solid product in Example 1(c) was performed at −5° C. using isopentane and that the preactivation step in (d) was omitted.

The subsequent separation of the solvent from the slurry by filtration and drying at 30° C. under reduced pressure gave a solid, supported metallocene catalyst (Ex-3).

Analysis of the resultant supported metallocene catalyst showed that it contained 0.58% by weight of Zr and 17.0% by weight of Al.

No agglomerate having a particle size of 350 μm or more was observed.

Example 4

Preactivated Supported Metallocene Catalyst (Ex-4)

A supported metallocene catalyst preactivated with a propylene homopolymer (Ex-4) was prepared by treatment under the same conditions as in Example 1, except that 16.6 mmol of rac-dimethylsilylenebis(2-methyl-4-phenylindenyl)-zirconium dichloride was used as the metallocene compound in Example 1(a).

The conditions and results for preparing the preactivated supported metallocene catalyst (Ex-4) are shown in Table 1.

Comparative Example 1

Preactivated Supported Metallocene catalyst (CEx-1)

A supported metallocene catalyst preactivated with a propylene homopolymer (CEx-1) was prepared by treatment under the same conditions as in Example 1, except that the temperature for contacting a reaction product of the metallocene compound and aluminoxane with silica in Example 1(b) was changed from 100° C. to 60° C.

The conditions and results for preparing the preactivated supported metallocene catalyst (CEx-1) are shown in Table 1.

Comparative Example 2

Preactivated Supported Metallocene Catalyst (CEx-2)

A supported metallocene catalyst preactivated with a propylene homopolymer (CEx-2) was prepared by treatment under the same conditions as in Example 1, except that the temperature for washing a solid product with n-hexane in Example 1(c) was changed from −10° C. to 60° C.

The conditions and results for preparing the preactivated supported metallocene catalyst (CEx-2) are shown in Table 1.

Comparative Example 3

Preactivated Supported Metallocene Catalyst (CEx-3)

A supported metallocene catalyst preactivated with a propylene homopolymer (CEx-3) was prepared by treatment under the same conditions as in Example 1, except that toluene was used in place of n-hexane as a washing solvent for the solid product in Example 1(c).

The conditions and results for preparing the preactivated supported metallocene catalyst (CEx-3) are shown in Table 1.

Comparative Example 4

Preactivated Supported Metallocene Catalyst (CEx-4)

In place of Examples 1(a) and (b), 16.6 mmol of the same metallocene compound as in Example 1 dissolved in 1 liter of toluene and 100 g of the same silica as in Example 1 were stirred at 100° C. for one hour and contacted. Subsequently, 1.37 liter of the same toluene solution of methylaluminoxane as in Example 1 was added and the mixture was further contacted at 100° C. for one hour with stirring to prepare a slurry containing a solid product.

The subsequent steps were carried out under the same conditions as in Example 1(c) and (d) to prepare a supported metallocene catalyst preactivated with a propylene homopolymer (CEx-4).

The conditions and results for preparing the preactivated supported metallocene catalyst (CEx-4) are shown in Table 1.

Comparative Example 5

Preactivated Supported Metallocene Catalyst (CEx-5)

In place of Example 1(a) and (b), 1.37 liter of the same toluene solution of methylaluminoxane as in Example 1 and 100 g of the same silica as in Example 1 were stirred at 100° C. for one hour and contacted, and then cooled to 30° C. A supernatant liquid was removed by decantation and the mixture was washed at 30° C. three times in total with 1 liter of toluene for each washing. 16.6 mmol of the same metallocene compound as in Example 1 were added, and the mixture was contacted at 40° C. for 10 minutes and further contacted at 100° C. for one hour with stirring to prepare a slurry containing a solid product.

The subsequent steps were carried out under the same conditions as in Example 1(c) and (d) to prepare a supported metallocene catalyst preactivated with a propylene homopolymer (CEx-5).

The conditions and results for preparing the preactivated supported metallocene catalyst (CEx-5) are shown in Table 1.

Comparative Example 6

Supported Metallocene Catalyst (CEx-6)

A 4-dm$^3$ glass reaction vessel equipped with a stirrer and purged with nitrogen was charged with 1.27 liter (3.81 mol in terms of Al atom) of a toluene solution of methylaluminoxane (concentration: 3 mol/L, trade name: PMAO manufactured by Tosoh Akzo K.K.). To the reaction vessel was added a slurry containing 21.1 mmol of a mixture of chiral dimethylsilylene(2,3,5-trimethylcyclopentadienyl)-(2',4',5'-trimethylcyclopentadienyl)zirconium dichloride and its meso form, dimethylsilylene(2,3,5-trimethylcyclopentadienyl)(2',3',5'-trimethylcyclopentadienyl)zirconium dichloride (1 mol % of meso content) as a metallocene compound in 500 ml of toluene, and the mixture was reacted at 25° C. for 10 minutes while stirring.

To the reaction vessel were added, over a period of 20 minutes, 100 g of silica having an average particle size of 51 μm (SYLOPOL® 948, manufactured by Grace Davison) which had been fired at 750° C. under reduced pressure for 8 hrs, and the mixture was stirred and held for 10 minutes.

The temperature within the reaction vessel was elevated to 70° C. While pouring nitrogen into the bottom of the reaction vessel in limited amounts, the solvent was evaporated under reduced pressure over a period of 9 hours, and discharged and removed from the top of the reaction vessel. The temperature within the reaction vessel was lowered to 25° C. to obtain a dried solid.

The resultant solid was found to be an agglomerate which was broken up with a spatula, and then the agglomerated solid was removed through a sieve with apertures of 350 μm to obtain a supported metallocene catalyst (CEx-6).

Analysis of the resultant supported metallocene catalyst (CEx-6) showed that it contained 0.71% by weight of Zr and 26.5% by weight of Al. The amount of the agglomerated solid which was removed through a sieve with apertures of 350 μm occupied 31% by weight of the total amount of supported catalysts.

TABLE 1

(Supported metallocene catalysts)

| | Example | | | | Comparative Example | | | | | |
|---|---|---|---|---|---|---|---|---|---|---|
| | 1 | 2 | 3 | 4 | 1 | 2 | 3 | 4 | 5 | 6 |
| Catalyst | Ex-1 | Ex-2 | Ex-3 | Ex-4 | CEx-1 | CEx-2 | CEx-3 | CEx-4 | CEx-5 | CEx-6 |
| Preparation of supported catalysts | | | | | | | | | | |
| Step (a) | | | | | | | | | | |
| Al/metallocene molar ratio (—) | 248 | 248 | 248 | 248 | 248 | 248 | 248 | 248 | 248 | 181 |
| Reaction temperature (° C.) | 25 | 25 | 25 | 25 | 25 | 25 | 25 | 100 | 100 | 25 |
| Reaction time (min) | 5 | 5 | 5 | 5 | 5 | 5 | 5 | 60 | 60 | 10 |
| Step (b) | | | | | | | | | | |
| Amount of support (g) | 100 | 100 | 100 | 100 | 100 | 100 | 100 | 100 | 100 | 100 |
| Contact temperature (° C.) | 100 | 100 | 115 | 100 | 60 | 100 | 100 | 100 | 100 | 25 |
| Contact time (hr) | 1 | 1 | 1 | 1 | 1 | 1 | 1 | 1 | 1.17 | 0.17 |

TABLE 1-continued (Supported metallocene catalysts)

| | Example | | | | Comparative Example | | | | | |
|---|---|---|---|---|---|---|---|---|---|---|
| | 1 | 2 | 3 | 4 | 1 | 2 | 3 | 4 | 5 | 6 |

Step (c)

| | | | | | | | | | | |
|---|---|---|---|---|---|---|---|---|---|---|
| Separation process | allowing to stand | allowing to stand | allowing to stand | allowing to stand | allowing to stand | allowing to stand | allowing to stand | allowing to stand | allowing to stand | evaporation |
| Washing solvent | n-hexane | n-hexane | i-pentane | n-hexane | n-hexane | n-hexane | toluene | n-hexane | n-hexane | — |
| Total amount of washing solvent used (1) | 10 | 10 | 10 | 10 | 10 | 10 | 10 | 10 | 10 | — |
| Washing (evaporation) temperature (° C.) | −10 | −10 | −5 | −10 | −10 | 60 | −10 | −10 | −10 | 70 |
| Total number of times of washing | 5 | 5 | 5 | 5 | 5 | 5 | 5 | 5 | 5 | — |
| Solid product | | | | | | | | | | |
| Zr content (wt %) | 0.61 | 0.61 | 0.58 | 0.34 | 0.44 | 0.38 | 0.16 | 0.49 | 0.23 | 0.71 |
| Al content (wt %) | 18.2 | 18.2 | 17.0 | 18.3 | 16.9 | 12.6 | 11.5 | 14.8 | 11.0 | 26.5 |
| >350 μm agglomerate content (wt %) | 0.0 | 0.0 | 0.0 | 0.0 | 0 | 0 | 0 | 0 | 0 | 31 |
| Preparation of preactivated catalyst Step (d) | | | | | | | | | | |
| Prepolymerizing olefin | Pr | Et | — | Pr | Pr | Pr | Pr | Pr | Pr | — |
| Polymerization temperature (° C.) | 0 | 0 | — | 0 | 0 | 0 | 0 | 0 | 0 | — |
| Feeding rate (mol/min) | 0.15 | 0.07 | — | 0.15 | 0.15 | 0.15 | 0.15 | 0.1 | 0.1 | — |
| Feeding time (min) | 90 | 90 | — | 90 | 90 | 90 | 90 | 90 | 90 | — |
| Preactivated catalyst | | | | | | | | | | |
| Amount of polyolefin supported (g/g) | 0.7 | 0.8 | — | 0.7 | 0.7 | 0.7 | 0.6 | 0.1 | 0.5 | — |

In the table, "Pr" stands for propylene, "Et" stands for ethylene and "—" shows an absence of the corresponding steps.

The data in step (a) of Comparative Example 4 are those on the contact of silica with metallocene compound, and the data in step (b) of Comparative Example 4 are those on the contact of the product in step (a) with aluminoxane. The data in step (a) of Comparative Example 5 are those on the contact of silica with aluminoxane and the data in step (b) of Comparative Example 5 are those on the contact of the product in step (a) with metallocene compound.

As shown in Table 1, in either case where the temperature for contacting the reaction product of the metallocene compound and aluminoxane with silica in step (b) was too low (Comparative Example 1), or where the washing or evaporation temperature in step (c) was too high (Comparative Examples 2 and 6), or where the solid product was washed with an aromatic hydrocarbon different from the aliphatic hydrocarbon (Comparative Example 3), the contents of the transition metal and aluminum atoms which are active components in the resultant supported metallocene catalysts are lower than those in the inventive Examples. This is one of the factors in the reduced polymerization activity of olefin.

When the contact order of the metallocene compound, aluminoxane and silica is varied (Comparative Examples 4 and 5), a process step becomes complicated, and the content of Al in the resultant supported metallocene catalyst (solid fine particles) and the content of the transition metal atom in Comparative Example 5 become lower than those in the inventive Examples, thus resulting in the reduced amount of polyolefin supported by prepolymerization of olefin and also the reduced final olefin polymerization activity.

In Comparative Example 6, the solvent was removed by evaporation (i.e., drying up of solvent), in place of washing. This process enables substantially all of the transition metal atoms derived from the metallocene compound and the aluminum atoms derived from aluminoxane to be supported on silica. However, this drying up of the solvent requires a great energy.

(B) Manufacture of Olefin Polymers (Evaluation of Catalyst)

Olefins were olymerized using the catalyst systems for olefin polymerization comprising the supported metallocene catalysts as prepared above (Ex-1 to Ex-4 and CEx-1 to CEx-6) in combination with organoaluminum compounds. The following characteristics of the catalysts and resultant polymers were evaluated.

For reference, an olefin was polymerized using a homogeneously mixed catalyst comprising the metallocene compound and aluminoxane, and the same evaluation was performed.

Rp: Olefin polymerization activity expressed by the weight (g) of olefin polymerized per hour of the polymerization time per gram of the supported metallocene catalyst (preactivated supported metallocene catalyst, if preactivated) (Unit: g polymer/g catalyst/hr).

ZRp: Olefin polymerization activity expressed by the weight (g) of olefin polymerized per hour of the polymerization time per mg of the transition metal atom (Zr) in the supported metallocene catalyst (Unit: g polymer/mg Zr/hr).

BD: Bulk density of the resultant olefin polymer (Unit: $kg/m^3$).

MFR: Melt flow rate of the olefin polymer determined under the condition 14 in Table 1 (a temperature of 230° C. and a load of 21.18N) according to JIS K7210 (Unit: g/10 min). Content of finely divided powders: Fraction of the olefin polymer powders passing through standard sieves with apertures of 210 µm (Unit: wt %).

Tm: Melting point of the olefin polymer determined using a differential scanning calorimeter (DSC 7 type manufactured by Perkin Elmer Co., Ltd.) (Unit: 0° C.)

Mw/Mn: Ratio of a weight average molecular weight (Mw) of the olefin polymer to a number average molecular weight (Mn) of the olefin polymer, i.e., a molecular weight distribution width (Mw/Mn), determined at 135° C. by a gel permeation chromatography (GPC-150C manufactured by Waters Co., Ltd.) with a mixed polystyrene gel column (PSK gel GMH6-HT manufactured by Tosoh K.K. in Japan) using a solution of 0.05% by weight of the polymer in o-dichlorobenzene.

Example 5

A 1.5-dm$^3$ stainless polymerization vessel equipped with a stirrer and purged with nitrogen was charged with 0.8 dm$^3$ of n-hexane, and subsequently, 1.5 mmol of triisobutylaluminum (an n-hexane solution at a concentration of 1 mol/L) and 60 mg of the preactivated supported metallocene catalyst (Ex-1) prepared in Example 1. The temperature within the polymerization vessel was elevated to 50° C., and propylene was fed to the vessel so as to keep the pressure therein at 1.08 MPa, to continue a slurry polymerization of propylene for one hour. After the polymerization time passed, the supply of propylene was stopped. Subsequently, unreacted propylene was discharged out of the system, the temperature within the polymerization vessel was cooled to 25° C., the vessel was opened, and the slurry within the vessel was taken out. Separation of the solvent by filtration gave the polymer. The resultant polymer was treated at 100° C. for 30 minutes with a nitrogen gas containing 5 vol % of water vapor to produce 180 g of isotactic polypropylene particles.

From the above results, the olefin polymerization activity (Rp) was calculated as 3000 g polymer/g catalyst/hr and the olefin polymerization activity (ZRp) was calculated as 492 g polymer/mg Zr/hr.

The resultant isotactic polypropylene particles were spherical, the bulk density (BD) was 400 kg/m$^3$, the average particle size was 820 µm and the content of finely divided powders of less than 210 µm was 0.2 wt %. The melting point (Tm) was 156° C., the molecular weight distribution width (Mw/Mn) was 2.1 and the melt flow rate (MFR) was 22 g/10 min.

After completion of the polymerization, neither presence of the agglomerated polymer within the opened polymerization vessel nor adhesion of the polymer to a wall surface of the vessel was observed.

Example 6

A 1.5-dm$^3$ stainless polymerization vessel equipped with a stirrer and purged with nitrogen was charged with 1.0 mmol of triethylaluminum (an n-hexane solution at a concentration of 1 mol/L), 0.8 dm$^3$ of liquefied propylene and 0.26 mol of ethylene. The temperature within the polymerization vessel was elevated to 50° C. and the mixture was kept for 30 minutes with stirring. 20 mg of the solid, preactivated supported metallocene catalyst (Ex-2) as prepared in Example 2 and 0.2 dm$^3$ of liquefied propylene were pressurized in the polymerization vessel to initiate a copolymerization of ethylene and propylene. After initiation of the copolymerization, the temperature within the polymerization vessel was kept at 50° C. and the copolymerization of ethylene and propylene was continued for 30 minutes. After the copolymerization time passed, unreacted ethylene and propylene was discharged out of the system, the temperature within the polymerization vessel was cooled to 25° C., the vessel was opened, and the polymer was taken out.

The resultant polymer was treated at 100° C. for 30 minutes with a nitrogen gas containing 5 vol % of water vapor to produce 78.6 g of isotactic ethylene/propylene copolymer particles.

From the above results, the olefin polymerization activity (Rp) was calculated as 7860 g polymer/g catalyst/hr and the olefin polymerization activity (ZRp) was calculated as 1289 g polymer/mg Zr/hr.

The resultant isotactic ethylene/propylene copolymer particles were spherical, the bulk density (BD) was 420 kg/m$^3$, the average particle size was 896 µm and the content of finely divided powders of less than 210 µm was 0.03 wt %. The melting point (Tm) was 138° C., and the molecular weight distribution width (Mw/Mn) was 2.4.

After completion of the copolymerization, neither presence of the agglomerated polymer within the opened polymerization vessel nor adhesion of the polymer to a wall surface of the vessel was observed.

Example 7

A 1.5-dm$^3$ stainless polymerization vessel equipped with a stirrer and purged with nitrogen was charged with 1.0 mmol of triethylaluminum (an n-hexane solution at a concentration of 1 mol/L) and 0.8 dm$^3$ of liquefied propylene. The temperature within the polymerization vessel was elevated to 50° C., 30 mg of the supported metallocene catalyst (Ex-3) as prepared in Example 3 slurried in 2 ml of n-hexane and 0.2 dm$^3$ of liquefied propylene were pressurized in the polymerization vessel and the polymerization was initiated. After initiation of the polymerization, the temperature within the polymerization vessel was kept at 50° C. and the bulk polymerization of propylene was continued for one hour. After the polymerization time passed, unreacted propylene was discharged out of the system, the temperature within the polymerization vessel was cooled to 25° C., the vessel was opened, and the polymer was taken out.

The resultant polymer was treated at 100° C. for 30 minutes with a nitrogen gas containing 5 vol % of water vapor to produce 142 g of isotactic polypropylene particles.

From the above results, the olefin polymerization activity (Rp) was calculated as 4730 g polymer/g catalyst/hr and the olefin polymerization activity (ZRp) was calculated as 816 g polymer/mg Zr/hr.

The resultant isotactic polypropylene particles were spherical, the bulk density (BD) was 410 kg/m$^3$, the average particle size was 960 µm and the content of finely divided powders of less than 210 µm was 0.02 wt %. The melting point (Tm) was 156° C., and the molecular weight distribution width (Mw/Mn) was 1.9.

After completion of the polymerization, neither presence of the agglomerated polymer within the opened polymerization vessel nor adhesion of the polymer to a wall surface of the vessel was observed.

Example 8

Propylene was polymerized under the same conditions as in Example 5 except for using the preactivated supported metallocene catalyst (Ex-4) in place of the preactivated supported metallocene catalyst (Ex-1) in Example 5, to produce 158 g of isotactic polypropylene particles.

From the above results, the olefin polymerization activity (Rp) was calculated as 2630 g polymer/g catalyst/hr and the olefin polymerization activity (ZRp) was calculated as 775 g polymer/mg Zr/hr.

The resultant isotactic polypropylene particles were spherical, the bulk density (BD) was 400 kg/m$^3$, the average particle size was 810 μm and the content of finely divided powders of less than 210 μm was 0.3 wt %. The melting point (Tm) was 146° C. and the molecular weight distribution width (Mw/Mn) was 2.2.

After completion of the polymerization, neither presence of the agglomerated polymer within the opened polymerization vessel nor adhesion of the polymer to a wall surface of the vessel was observed.

Comparative Example 7

Polypropylene was produced by treatment under the same conditions as in Example 5, except that the preactivated supported metallocene catalyst (CEx-1) as prepared in Comparative Example 1 was used in place of the supported metallocene catalyst (Ex-1) in Example 5.

The conditions and results for polymerizing propylene are shown in Table 2.

Comparative Example 8

Polypropylene was produced by treatment under the same conditions as in Example 5, except that the preactivated supported metallocene catalyst (CEx-2) as prepared in Comparative Example 2 was used in place of the supported metallocene catalyst (Ex-1) in Example 5.

The conditions and results for polymerizing propylene are shown in Table 2.

Comparative Example 9

Polypropylene was produced by treatment under the same conditions as in Example 5, except that the preactivated supported metallocene catalyst (CEx-3) as prepared in Comparative Example 3 was used in place of the supported metallocene catalyst (Ex-1) in Example 5.

The conditions and results for polymerizing propylene are shown in Table 2.

Comparative Example 10

5 g of an isotactic polypropylene were produced by treatment under the same conditions as in Example 5, except that the preactivated supported metallocene catalyst (CEx-4) as prepared in Comparative Example 4 was used in place of the supported metallocene catalyst (Ex-1) in Example 5.

The conditions and results for polymerizing propylene are shown in Table 2.

Comparative Example 11

45 g of an isotactic polypropylene were produced by treatment under the same conditions as in Example 5, except that the preactivated supported metallocene catalyst (CEx-5) as prepared in Comparative Example 5 was used in place of the supported metallocene catalyst (Ex-1) in Example 5.

The conditions and results for polymerizing propylene are shown in Table 2.

Comparative Example 12

75 g of isotactic polypropylene particles were produced by polymerizing propylene under the same conditions as in Example 7, except that the supported metallocene catalyst (CEx-6) as prepared in Comparative Example 6 was used in place of the supported metallocene catalyst (Ex-3) in Example 7.

From the above results, the olefin polymerization activity (Rp) was calculated as 2500 g polymer/g catalyst/hr and the olefin polymerization activity (ZRp) was calculated as 352 g polymer/mg Zr/hr.

The resultant isotactic polypropylene particles were substantially spherical, the bulk density (BD) was 390 kg/m$^3$, the average particle size was 810 μm and the content of finely divided powders of less than 210 μm was 0.03 wt %. An agglomerated polymer wherein several particles were aggregated was observed. The melting point (Tm) was 155° C. and the molecular weight distribution width (Mw/Mn) was 2.0.

After completion of the polymerization, no adhesion of the polymer to a wall surface of the opened polymerization vessel was observed.

The conditions and results for polymerizing propylene are shown in Table 2.

Referential Example

A 1.5-dm$^3$ stainless polymerization vessel equipped with a stirrer and purged with nitrogen was charged with 1.5 ml (4.5 mmol in terms of Al atom) of a toluene solution of methylaluminoxane (concentration: 3 mol/L, trade name: PMAO manufactured by Tosoh Akzo K.K.) and 1.0 dm$^3$ of liquefied propylene. The temperature within the vessel was elevated to 60° C. 0.0005 mmol of a mixture (CEx-6) of chiral dimethylsilylene(2,3,5-trimethylcyclopentadienyl)(2', 4',5'-trimethylcyclopentadienyl)zirconium dichloride and its meso form, dimethylsilylene(2,3,5-trimethylcyclopentadienyl)-(2',3',5'-trimethylcyclopentadienyl)zirconium dichloride (1 mol % of meso content) and 3 mmol (in terms of Al atom) of a toluene solution of methylaluminoxane (as mentioned above) were treated at 25° C. for 15 minutes in 20 ml of toluene to prepare a mixed solution. The mixed solution was pressurized under nitrogen in the polymerization vessel to initiate the polymerization of propylene. Although it was tried to control the temperature within the vessel to 60° C., the temperature within the vessel rose 30 minutes after the polymerization initiation and it was difficult to control the temperature to 60° C. In this situation, 10 mmol of isopropyl alcohol were pressurized under nitrogen to terminate the polymerization.

After termination of the polymerization, unreacted propylene was discharged out of the system and the temperature within the vessel was cooled to 25° C. After cooling, the vessel was opened and it was observed that 1.6 g of a polymer scale was adhered on the wall of the vessel. 24.5 g of isotactic polypropylene including the adhered scale were recovered from the polymerization vessel.

From the above results, the olefin polymerization activity (ZRp) was calculated as 1074 g polymer/mg Zr/hr.

The resultant polypropylene particles were finely particulate, the bulk density (BD) was 180 kg/m$^3$, and the average particle size was 23 μm, which was extremely finely divided powders. The melting point (Tm) was 157° C. and the molecular weight distribution width (Mw/Mn) was 2.0.

The conditions and results for polymerizing propylene are shown in Table 2.

TABLE 2

(Olefin polymerization, Evaluation of supported metallocene catalysts)

| | Example | | | | Referential | Comparative Example | | | | | |
|---|---|---|---|---|---|---|---|---|---|---|---|
| | 5 | 6 | 7 | 8 | Example | 7 | 8 | 9 | 10 | 11 | 12 |
| Olefin polymerization | | | | | | | | | | | |
| Polymerization process | slurry | bulk | bulk | slurry | bulk | slurry | slurry | slurry | slurry | slurry | bulk |
| Olefin | Pr | Pr-Et | Pr | Pr | Pr | Pr | Pr | Pr | Pr | Pr | Pr |
| Catalyst | Ex-1 | Ex-2 | Ex-3 | Ex-4 | homogeneously mixed | CEx-1 | CEx-2 | CEx-3 | CEx-4 | CEx-5 | CEx-6 |
| Amount of catalyst (mg) | 60 | 20 | 30 | 60 | 0.0005 mmol | 60 | 60 | 60 | 60 | 60 | 30 |
| Organoaluminum compound | TiBA | TEA | TEA | TiBA | MAO | TiBA | TiBA | TiBA | TiBA | TiBA | TEA |
| Added amount (mmol) | 1.5 | 1.0 | 1.0 | 1.5 | 7.5 | 1.5 | 1.5 | 1.5 | 1.5 | 1.5 | 1.0 |
| Polymerization temperature (° C.) | 50 | 50 | 50 | 50 | 60 | 50 | 50 | 50 | 50 | 50 | 50 |
| Polymerization pressure (MPa) | 1.08 | 2.11 | 2.11 | 1.08 | 2.50 | 1.08 | 1.08 | 1.08 | 1.08 | 1.08 | 2.11 |
| Polymerization time (hr) | 1 | 0.5 | 1 | 1 | 0.5 | 1 | 1 | 1 | 1 | 1 | 1 |
| Amount of polymer produced (g) | 180 | 78.6 | 142 | 158 | 24.5 | 83.7 | 87.0 | 30.6 | 5.0 | 45.0 | 75.0 |
| Rp (g/g catalyst/hr) | 3000 | 7860 | 4730 | 2630 | — | 1395 | 1450 | 510 | 83 | 750 | 2500 |
| ZRp (g/mg Zr/hr) | 492 | 1289 | 816 | 775 | 1074 | 317 | 382 | 319 | 17 | 326 | 352 |
| Produced olefin polymer | | | | | | | | | | | |
| Bulk density (kg/m$^3$) | 400 | 420 | 410 | 400 | 180 | 390 | 390 | 390 | 200 | 390 | 390 |
| Average particle size (μm) | 820 | 896 | 960 | 810 | 23 | 590 | 600 | 450 | 55 | 490 | 760 |
| Content of finely divided powder (wt %) | 0.2 | 0.03 | 0.02 | 0.3 | 93.5 | 1.5 | 0.7 | 0.2 | 95 | 0.4 | 0.03 |
| Melting point (° C.) | 156 | 138 | 156 | 146 | 157 | 156 | 156 | 156 | 161 | 155 | 155 |
| Mw/Mn (-) | 2.1 | 2.4 | 1.9 | 2.2 | 2.0 | 2.2 | 2.1 | 2.0 | 2.5 | 2.3 | 2.0 |

The abbreviations in the Table stand for the followings.
TiBA: triisobutylaluminum
TEA: triethylaluminum
MAO: methylaluminoxane Table 2 shows that the olefin polymerization activity (Rp and ZRp) of the supported metallocene catalysts prepared in the inventive Examples is higher than that of the supported metallocene catalyst prepared in any of the Comparative Examples. The melting point (Tm) of the propylene polymers produced in the inventive Examples is substantially identical with that of the propylene polymers produced in Referential Example using a homogeneous catalyst system. This indicates that the lowering of high stereoregularity is controlled. (C) Analysis of the fine structure of supported metallocene catalyst Regarding non-preactivated, supported metallocene catalysts which were prepared in Example 1 and Comparative Example 6, their BET specific surface area (m$^2$/g), pore volume (ml/g) and pore distribution were calculated from the nitrogen isothermal adsorption-desorption data according to the nitrogen adsorption-desorption method, by contrast with the finely particulate inorganic supports used in the preparation of the supported catalysts.

The specific surface area was calculated from the initial nitrogen isothermal adsorption data by an extrapolation to monomolecular adsorption film. The pore distribution and average pore diameter (Å) were calculated from the nitrogen isothermal desorption data.

Example 9

The nitrogen isothermal adsorption-desorption curve of the non-preactivated supported metallocene catalyst prepared in Example 1 is shown in FIG. 2 and the pore distribution curve calculated from the data thereof is shown in FIG. 3. Further, the BET specific surface area (m$^2$/g), pore volume (ml/g) and average pore diameter (Å) are shown in Table 3.

Comparative Example 13

Figure 4:
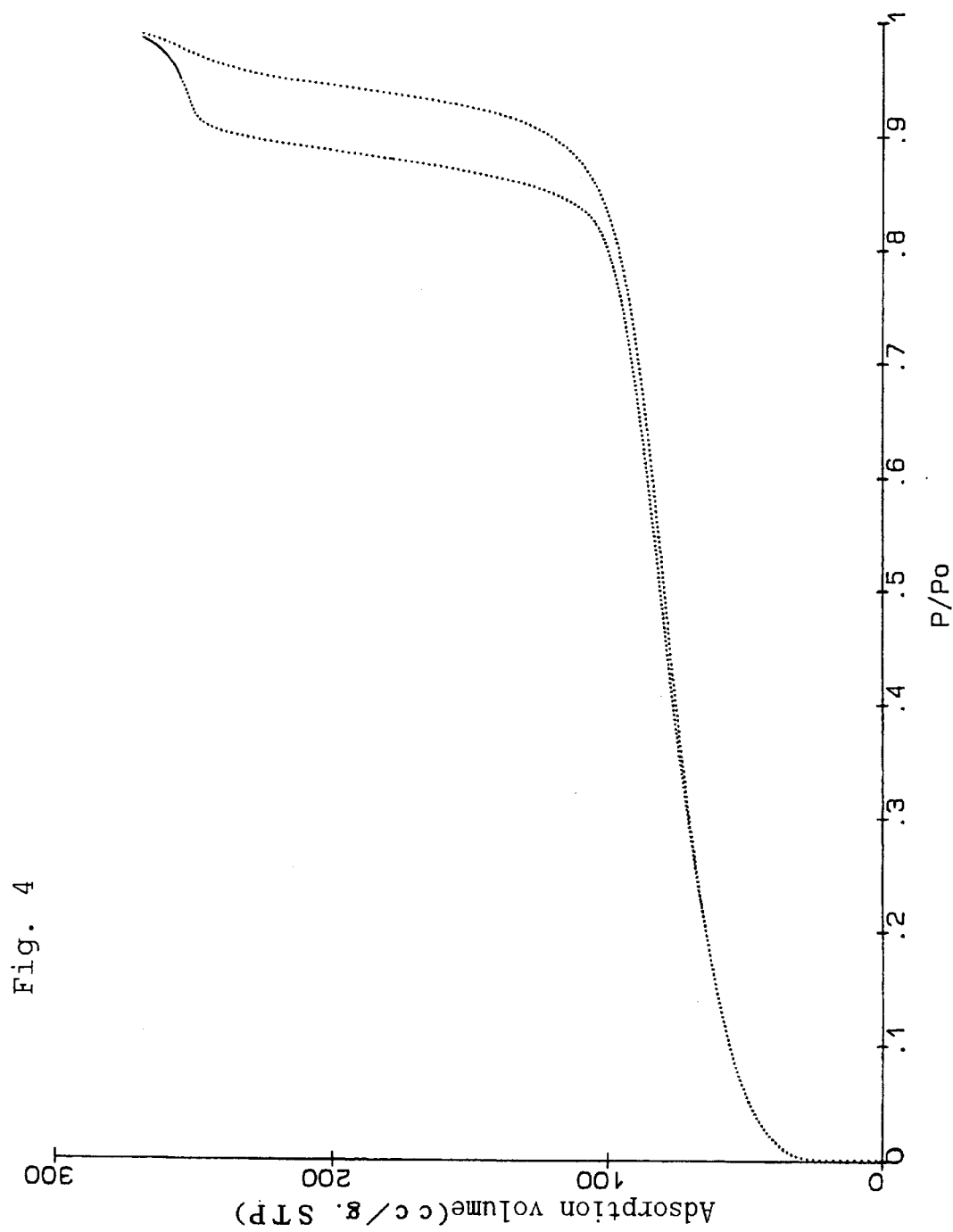
FIG. 4 is a nitrogen isothermal adsorption-desorption curve of the supported metallocene catalyst by solvent evaporation treatment which is prepared in Comparative Example 6.
Figure 5:
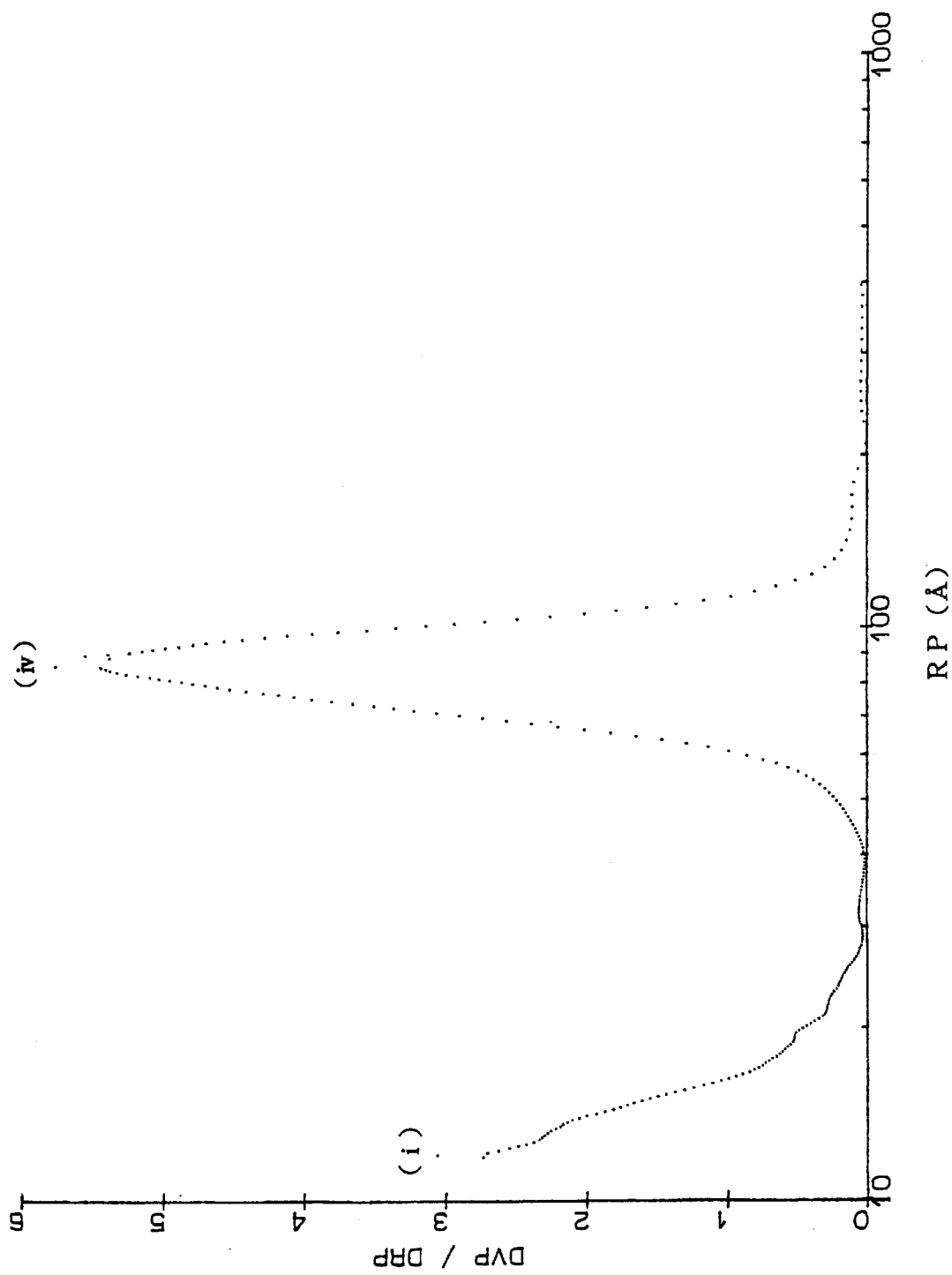
FIG. 5 is a pore distribution curve of the supported metallocene catalyst by solvent evaporation treatment which is prepared in Comparative Example 6.

The nitrogen isothermal adsorption-desorption curve of the supported metallocene catalyst (CEx-6) prepared in Comparative Example 6 is shown in FIG. 4 and the pore distribution curve calculated from the data thereof is shown in FIG. 5. Further, the BET specific surface area (m$^2$/g), pore volume (ml/g) and average pore diameter (Å) are shown in Table 3.

Contrast Example 1

The nitrogen isothermal adsorption-desorption curve of the finely particulate inorganic supports (silica) used in the preparation of the supported metallocene catalysts of Example 1 and Comparative Example 6 is shown in FIG. 6 and the pore distribution curve calculated from the data thereof is shown in FIG. 7. Further, the BET specific surface area (m$^2$/g), pore volume (ml/g) and average pore diameter (Å) obtained from the data are shown in Table 3.

TABLE 3

| | Example 9 | Comparative Example 13 | Contrast Example 1 |
|---|---|---|---|
| BET specific surface area (m$^2$/g) | 273 | 229 | 292 |
| Pore volume (ml/g) | 0.52 | 0.35 | 1.63 |
| Average pore diameter (Å) | 76 | 61 | 223 |

The pore distribution curve (FIG. 3) of the present supported metallocene catalyst shows the presence of three characteristic peaks (i), (ii) and (iv). (iii) shows the presence of a peak, but it is not clear whether (iii) shows a substantial peak, since the strength is weak. On the other hand, the pore distribution curve (FIG. 5) of the supported metallocene catalyst prepared in Comparative Example 6 shows the existence of only two characteristic peaks (i) and (iv). The peaks corresponding to (ii) and (iii) shown in FIG. 3 are feeble, thus their existence being indefinite.

The main peak (iv) shown in FIG. 3 corresponds to the main peak (iv) shown in the pore distribution curve (FIG. 7) of the finely particulate inorganic support. The location of the main peak (iv) in FIG. 3 (Example 9) shifts from that of the main peak (iv) in FIG. 7 (Contrast Example 1) to the lower one by about 10 Å. The location of the peak (iv) in FIG. 5 (Comparative Example 13) is substantially identical with that in FIG. 7 (Contrast Example 1) and no shift is observed.

This difference is presumed to be attributable to the following facts. For the supported metallocene catalysts prepared in the inventive Examples, the pore wall of the finely particulate inorganic support was coated with a film of the reaction product of the metallocene compound and aluminoxane, resulting in reduced pore diameter. For the supported metallocene catalysts prepared in the Comparative Examples, the reaction product of the metallocene compound and aluminoxane was only accumulated within the pores of the finely particulate inorganic support.

Further, peak (i) is present in FIGS. 3 (Example 9) and 5 (Comparative Example 13), but is not observed in FIG. 7 (Contrast Example 1), from which it is presumed that peak (i) indicates a pore of the film of the reaction product of the metallocene compound and aluminoxane.

In the upper curve (nitrogen isothermal desorption curve) of FIG. 3 (Example 9), $P/P_0$ shows a rapid change in nitrogen adsorption in the range of 0.4–0.5, wherein $P_0$ represents a nitrogen pressure upon completion of adsorption and P represents a nitrogen pressure upon adsorption-desorption. This change indicates that the pore having a specific peak (ii) in FIG. 3 (pore distribution curve in Example 9) is characterized by an ink bottle configuration wherein a diameter of the inlet is small and there is a large space inside.

In the lower curve (nitrogen isothermal adsorption curve) of FIG. 2 (Example 9) showing the stage where nitrogen is adsorbed in the pore, no rapid change in nitrogen adsorption appears in the range of 0.4–0.5 at $P/P_0$, as observed above in the nitrogen isothermal desorption curve. This is due to the fact that the adsorbed nitrogen is growing into a uniform, thin nitrogen liquid film on the pore wall. The change in nitrogen adsorption in the nitrogen isothermal desorption curve (upper curve in FIG. 2) shows the change in adsorption wherein nitrogen blows off from the inside of the pore abruptly at the time of the nitrogen pressure within the pore going up to the pressure at which the inlet of the pore opens, in the stage where the nitrogen liquid film adsorbed on the pore wall is desorbing. This demonstrates that the pore having the peak (ii) in FIG. 3 is of the ink bottle configuration.

In FIGS. 4 (Comparative Example 13) and 6 (Contrast Example 1), the nitrogen isothermal adsorption curve and the nitrogen isothermal desorption curve overlap. No rapid deviation in the nitrogen isothermal desorption curve as in FIG. 2 (Example 9) is observed.

It is presumed that the pores of an ink bottle configuration in Example 9 have the reaction product of the metallocene compound and aluminoxane adhered to and held at an inner wall of the pore of the finely particulate inorganic support, especially around the inlet of the pore.

In Comparative Example 13, it is presumed that a part of pore in the finely particulate inorganic support, especially a pore of small diameter is blockaded upon evaporation of a reaction solvent by heating, resulting in no formation of an ink bottle configuration.

As a result, there is no great difference between the average pore diameters in Example 9 and Comparative Example 13, as shown in Table 3. However, the pore volume in Example 9 is approximately twice as large as that in Comparative Example 13 and the BET specific surface area in Example 9 is larger than that in Comparative Example 13.

Larger BET specific surface area in Example 9 demonstrates that active sites in the olefin polymerization are much more, and more specifically, that the transition metal atom is exposed on the surface of the supported metallocene catalyst.

Industrial Applicability

As shown in Table 1, the supported metallocene catalysts and their preactivated catalysts for olefin polymerization prepared in Examples 1–4 are lower in the amount of the metallocene compound and aluminoxane supported, as compared with the supported catalyst prepared in Comparative Example 6. In spite of this fact, the results of the polymerization of olefin using these catalysts show their high polymerization activities (Rp and ZRp) as shown in Examples 5–8 in Table 2, and the resultant olefin polymers have higher bulk density (BD). Further, the melting points (Tm) of the olefin polymers produced in Examples 5 and 7 are substantially identical with that of polypropylene produced in Contrast Example using the unsupported, homogeneously mixed catalyst system, which indicates that a reduction in stereoregularity is controlled.

As mentioned above, the supported metallocene catalysts of the present invention having extremely high olefin polymerization activity permit a reduction in the amount of aluminoxane used, an improvement in the bulk density and particle morphology of the olefin polymers produced using these catalysts and a control of the reduction in stereoregularity.

Further, the inventive processes for preparing the supported metallocene catalyst for olefin polymerization have the advantages that the control in each process step is a simplified and that the amount of energy consumption becomes smaller as compared with removal of a reaction solvent by evaporation.

The present invention provides the supported metallocene catalysts which permit an industrial production of olefin polymers, the processes for preparing the same, and the processes for producing the olefin polymers using these supported metallocene catalysts; it is extremely significant in the industry.

What is claimed is:

1. A supported metallocene catalyst for olefin polymerization comprising solid fine particles which comprise a reaction product of a metallocene compound and aluminoxane supported on a fine particulate inorganic support, said solid fine particles being produced by carrying out in order of the following steps:

(a) reacting a metallocene compound with an aluminoxane in an aromatic hydrocarbon solvent to form a reaction product, (b) contacting the reaction product with a fine particulate inorganic support at a temperature of 85 to 150° C. in the presence of any aromatic hydrocarbon solvent to form a solid product having the reaction product supported on said inorganic support, and (c) washing the solid product with an aliphatic hydrocarbon solvent at a temperature of −50° C. to +30° C.

2. The supported metallocene catalyst of claim 1 which is preactivated by further carrying out, subsequently to step (c), step (d) of prepolymerizing an olefin by introducing the olefin into a slurry of the solid fine particles dispersed in any aliphatic hydrocarbon solvent to have a prepolymerized polyolefin supported on the solid fine particles.

3. The supported metallocene catalyst of claim 1 wherein the solid fine particles contain 0.01 to 5% by weight of a transition metal derived from the metallocene compound and 0.1 to 50% by weight of aluminum derived from the aluminoxane.

4. The supported metallocene catalyst of claim 2 wherein the prepolymerized olefin polymer is supported in an amount of 0.01 to 100 kg per kg of the solid fine particles.

5. The supported metallocene catalyst of claim 2 wherein the olefin is ethylene, propylene, 1-butene or a mixture of two or more of them.

6. The supported metallocene catalyst of claim 1 wherein the metallocene compound is an organic complex of a transition metal represented by formula (1)

$$R_qMX_{p-q} \quad (1)$$

wherein M represents a transition metal selected from the group consisting of Y, Sm, Zr, Ti, Hf, V, Nb, Ta and Cr, p represents a coordination number of a transition metal atom M, q is 1 or 2, R or R's represent π-electron conjugated ligand having a molecular structure or structures selected from the group consisting of η-cyclopentadienyls, η-benzenes, η-cycloheptatrienyls and η-cyclooctatetraenes, and X represents a hydrogen atom, a halogen atom, a hydrocarbyl radical of 1–20 carbons, a silicon-containing hydrocarbyl radical, a sulfur-containing hydrocarbyl radical or a nitrogen-containing hydrocarbyl radical, which may be a divalent radical attachable to R.

7. The supported metallocene catalyst of claim 6 wherein the metallocene compound is the compound of formula (1) in which the π-electron conjugated ligand R has one or two η-cyclopentadienyl structures selected from substituted cyclopentadienyl groups, unsubstituted or substituted indenyl groups, unsubstituted or substituted hydrogenated indenyl groups, or unsubstituted or substituted fluorenyl groups.

8. The supported metallocene catalyst of claim 6 wherein the metallocene compound is the compound of formula (1) in which two a-electron conjugated ligands R's are linked each other through a divalent linking group.

9. The supported metallocene catalysts of claim 1 wherein the metallocene compound is represented by formula (2)

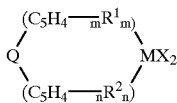
(2)

wherein M represents Ti, Zr or Hf,

Q represents a divalent hydrocarbyl radical, a silylene group, a germylene group or a stannylene group, X independently represents a hydrogen atom, a halogen atom or a hydrocarbyl radical of 1–20 carbons, and $(C_5H_{4-m}R^1_m)$ and $(C_5H_{4-n}R^2_n)$ each represent a substituted cyclopentadienyl group in which m and n are each an integer of 1 to 3, and $R^1$ and $R^2$ independently represent a hydrocarbyl group of 1 to 20 carbons, an oxygen-containing hydrocarbyl radical, a silicon-containing hydrocarbyl radical, a sulfur-containing hydrocarbyl radical, a nitrogen-containing hydrocarbyl radical or a divalent hydrocarbyl radical wherein two of $R^1$'s or two of $R^2$'s, joined with an adjacent carbon on the cyclopentadienyl ring, can form a saturated or unsaturated monocyclic or polycyclic ring having 4 to 8 carbons within the ring.

10. The supported metallocene catalyst of claim 9 wherein the metallocene compound is dimethylsilylene(2,3,5-trimethylcyclopentadienyl)(2',4',5'-trimethylcyclopentadienyl)titanium dichloride, dimethylsilylene(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)zirconium dimethyl, dimethylsilylene(2,3,5-trimethylcyclopentadienyl)(2',4 ,5'-trimethylcyclopentadienyl)hafnium dichloride or dimethylgermylene(2,3,5-trimethylcyclopentadienyl)(2',4', 5'-trimethylcyclopentadienyl)zirconium dichloride.

11. The supported metallocene catalyst of claim 1 wherein the aluminoxane is a linear or cyclic alkylaluminoxane having an alkyl group of 1 to 6 carbons.

12. The supported metallocene catalyst of claim 11 wherein the alkylaluminoxane is methylaluminoxane.

13. The supported metallocene catalyst of claim 1 wherein the finely particulate inorganic support is constituted by finely particulate metal oxide particles having a particle size of 5 to 300 μm.

14. The supported metallocene catalyst of claim 13 wherein the metal oxide is silica.

15. The supported metallocene catalyst of claim 1 wherein the temperature at which the reaction product is contacted with the finely particulate inorganic support in step (b) is from 95° C. to 120° C.

16. The supported metallocene catalyst of claim 1 wherein the temperature at which the solid product is washed with the aliphatic hydrocarbon in step (c) is from −30° C. to +100° C.

17. A supported metallocene catalyst which comprises solid fine particles wherein a reaction product of a metallocene compound and an aluminoxane is supported on a finely particulate inorganic support and the solid fine particles have a BET specific surface area of 85–98% of that of the finely particulate inorganic support and an average pore volume of 25–60% of that of the finely particulate inorganic support, and further have at least three peaks in a pore distribution curve based on nitrogen adsorption-desorption data.

18. The supported metallocene catalyst of claim 17 wherein the finely particulate inorganic support is silica.

19. A process for producing an olefin polymer which comprises polymerizing an olefin in the presence of a catalyst system comprising the supported metallocene catalyst defined in claim 1 in combination with an organoaluminum compound.

20. The process for producing the olefin polymer of claim 19 wherein the organoaluminum compound is triethyl aluminum or tri-isobutyl aluminum.

* * * * *

UNITED STATES PATENT AND TRADEMARK OFFICE
CERTIFICATE OF CORRECTION

PATENT NO. : 6,420,501 B1
DATED : July 16, 2002
INVENTOR(S) : Toshihiro Uwai et al.

It is certified that error appears in the above-identified patent and that said Letters Patent is hereby corrected as shown below:

Column 8,
Line 20, replace with,

-- 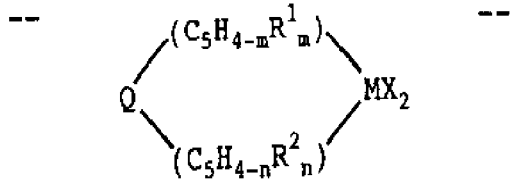 --

Column 23,
Line 6, change "(Unit:0°C)" to -- (Unit: 'C) --

Column 31,
Line 45, replace with,

-- 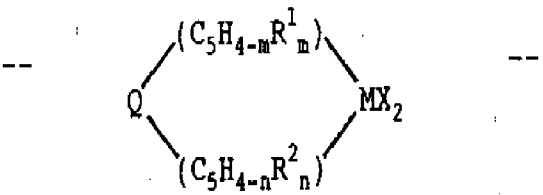 --

Column 32,
Line 37, change "-30°C" to +100°C" to -- -30°C to +10°C --

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,420,501 B1
DATED : July 16, 2002
INVENTOR(S) : Toshihiro Uwai et al.

It is certified that error appears in the above-identified patent and that said Letters Patent is hereby corrected as shown below:

Column 8,
Line 20, replace with,

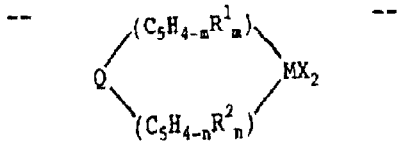

Column 23,
Line 6, change "(Unit:0ºC)" to -- (Unit: ºC) --

Column 31,
Line 45, replace with,

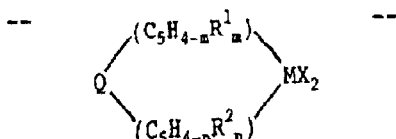

Column 32,
Line 37, change "-30ºC" to +100ºC" to -- -30ºC +10ºC --

This certificate supersedes Certificate of Correction issued July 1, 2003.

Signed and Sealed this

Twenty-ninth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,420,501 B1  Page 1 of 1
DATED : July 16, 2002
INVENTOR(S) : Toshihiro Uwai et al.

It is certified that error appears in the above-identified patent and that said Letters Patent is hereby corrected as shown below:

Column 8,
Line 20, replace with,

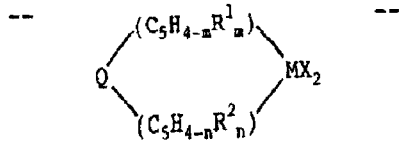

Column 23,
Line 6, change "(Unit:0ºC)" to -- (Unit: ºC) --

Column 31,
Line 45, replace with,

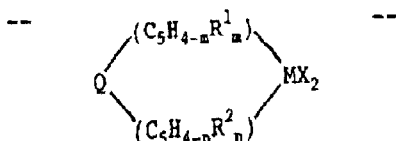

Column 32,
Line 37, change "-30ºC" to +100ºC" to -- -30ºC to +10ºC --

This certificate supersedes Certificate of Correction issued July 29, 2003.

Signed and Sealed this

Fourth Day of November, 2003

JAMES E. ROGAN
*Director of the United States Patent and Trademark Office*